United States Patent
Shiraiwa et al.

(10) Patent No.: US 8,421,751 B2
(45) Date of Patent: Apr. 16, 2013

(54) COMPUTER-READABLE STORAGE MEDIUM HAVING INFORMATION PROCESSING PROGRAM STORED THEREIN, INFORMATION PROCESSING SYSTEM, AND INFORMATION PROCESSING METHOD

(75) Inventors: Yusuke Shiraiwa, Kyoto (JP); Yasuyuki Oyagi, Kyoto (JP); Junji Morii, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 463 days.

(21) Appl. No.: 12/723,875

(22) Filed: Mar. 15, 2010

(65) Prior Publication Data

US 2011/0157013 A1    Jun. 30, 2011

(30) Foreign Application Priority Data

Dec. 28, 2009    (JP) ................. 2009-298461

(51) Int. Cl.
*G06F 3/033* (2006.01)
*G09G 5/08* (2006.01)

(52) U.S. Cl.
USPC ......................................... 345/157; 345/173

(58) Field of Classification Search ........... 345/156–184
See application file for complete search history.

(56) References Cited

U.S. PATENT DOCUMENTS

| | | | |
|---|---|---|---|
| 5,327,161 A * | 7/1994 | Logan et al. ................ | 345/157 |
| 5,943,052 A | 8/1999 | Allen et al. | |
| 6,459,424 B1 | 10/2002 | Resman | |
| 7,394,453 B2 * | 7/2008 | Woolley et al. ............... | 345/157 |
| 2004/0150630 A1 | 8/2004 | Hinckley et al. | |
| 2005/0264538 A1 | 12/2005 | Yeh | |
| 2007/0018968 A1 | 1/2007 | Iwamoto et al. | |
| 2008/0024454 A1 * | 1/2008 | Everest ........................ | 345/173 |
| 2008/0291173 A1 | 11/2008 | Suzuki | |
| 2009/0265658 A1 | 10/2009 | Klishko et al. | |
| 2009/0292989 A1 * | 11/2009 | Matthews et al. ............. | 715/702 |

FOREIGN PATENT DOCUMENTS

| | | |
|---|---|---|
| JP | 7-182092 | 7/1995 |
| WO | 98/00775 | 1/1998 |

* cited by examiner

*Primary Examiner* — Stephen Sherman

(74) *Attorney, Agent, or Firm* — Nixon & Vanderhye, P.C.

(57) ABSTRACT

A free direction input area, a lateral direction input area, and a longitudinal direction input area are provided on an input surface of a touch panel. When a user performs a slide operation whose starting point is within the free direction input area, movement of a virtual camera is controlled based on a change amount of a touch position with respect to X- and Y-axis directions. When the user performs a slide operation whose starting point is within the lateral direction input area, movement of the virtual camera is controlled based on a change amount of a touch position only with respect to the X-axis direction. When the user performs a slide operation whose starting point is within the longitudinal direction input area, movement of the virtual camera is controlled based on a change amount of a touch position only with respect to the Y-axis direction.

31 Claims, 16 Drawing Sheets

COMPUTER-READABLE STORAGE MEDIUM HAVING INFORMATION PROCESSING PROGRAM STORED THEREIN, INFORMATION PROCESSING SYSTEM, AND INFORMATION PROCESSING METHOD

CROSS REFERENCE TO RELATED APPLICATION

The disclosure of Japanese Patent Application No. 2009-298461, filed Dec. 28, 2009, is incorporated herein by reference.

BACKGROUND OF THE INVENTION

1. Field of the Invention

The present invention relates to a computer-readable storage medium having an information processing program stored therein, an information processing system, and an information processing method. The present invention particularly relates to a computer-readable storage medium having an information processing program stored therein, an information processing system, and an information processing method, which allow an input to be performed via a pointing device or the like.

2. Description of the Background Art

Conventionally, there are known techniques for scrolling an image or moving an object in a virtual space in accordance with, for example, a position touched by a user which is detected by a touch panel, or the amount of change in the touch position (e.g., a vector input device disclosed in Japanese Laid-Open Patent Publication No. H07-182092; hereinafter, referred to as conventional art).

When a user scrolls an image or moves an object placed in a virtual space by using a pointing device such as a touch panel, the user may wish to scroll the image or move the object in a direction that precisely coincides with a predetermined axis direction (e.g., a coordinate axis direction that is used to indicate a position in the virtual space). However, even if the user thinks that the user has changed a touch position in a direction that precisely coincides with the predetermined axis, an actual direction in which the user has changed the touch position deviates from the user's intended direction. The aforementioned conventional art cannot eliminate the influence of such deviation that occurs when the user changes the touch position. Thus, the above conventional art does not allow the user, who wishes to move the object in a direction that precisely coincides with the predetermined axis, to perform a pleasant input.

SUMMARY OF THE INVENTION

Therefore, an object of the present invention is to realize both a free operation and a precise operation that use a pointing device.

The present invention has the following features to solve the problems mentioned above.

A computer-readable storage medium of the present invention has an information processing program stored therein. The information processing program is executed by a computer of an information processing apparatus that is capable of receiving an input from a pointing device that is capable of designating an arbitrary position in a multidimensional designation area. The information processing program causes the computer to act as: designated coordinates receiving means, area determination means, first processing means, and second processing means. The designated coordinates receiving means repeatedly receives designated coordinates that indicate a position, in the designation area, designated by the pointing device. The area determination means determines whether or not the designated coordinates received by the designated coordinates receiving means belong to a first designation area in the designation area, and determines whether or not the designated coordinates received by the designated coordinates receiving means belong to a second designation area in the designation area. When the area determination means has determined that the designated coordinates belong to the first designation area, the first processing means performs predetermined processing by using a direction that is based on the designated coordinates received by the designated coordinates receiving means. When the area determination means has determined that the designated coordinates belong to the second designation area, the second processing means performs the predetermined processing by using a direction that is a result of correcting the direction, which is based on the designated coordinates received by the designated coordinates receiving means, so as to extend along a predetermined direction.

The direction, which is based on the designated coordinates, may be a direction that connects predetermined coordinates and the designated coordinates.

The predetermined coordinates may be designated coordinates that are designated first among a series of designated coordinates received by the designated coordinates receiving means.

Alternatively, the predetermined coordinates may be fixed coordinates in the designation area.

Further alternatively, the predetermined coordinates may be designated coordinates that have been received immediately previously to the designated coordinates and that are among a series of designated coordinates received by the designated coordinates receiving means.

When the area determination means has determined that the designated coordinates belong to the second designation area, the second processing means may perform the predetermined processing by using a predetermined direction component of the designated coordinates received by the designated coordinates receiving means.

The designation area may include the first designation area that is a single designation area and a plurality of the second designation areas.

The second designation area may be set to be located at an end of the designation area. This allows a user to readily designate a position within the second designation area without looking at the second designation area. Thus, operability is improved.

The predetermined direction may be in parallel with one of two coordinate axes that define the designated coordinates.

The predetermined processing may be processing for controlling a predetermined control target.

The predetermined control target may be a virtual camera placed in a virtual space.

The predetermined processing may be processing for controlling movement of the virtual camera.

Alternatively, the predetermined control target may be an object placed in a virtual space, and the predetermined processing may be processing for controlling the object.

The predetermined processing may be processing for controlling movement of the object.

The designated coordinates may be represented by an X-coordinate value and a Y-coordinate value. When the area determination means has determined that the designated coordinates belong to the first designation area, the first processing means may perform the predetermined processing by using both the X-coordinate value and the Y-coordinate value of the designated coordinates received by the designated coordinates receiving means. When the area determination means has determined that the designated coordinates belong to the second designation area, the second processing means may perform the predetermined processing by using only one of the X-coordinate value and the Y-coordinate value of the designated coordinates received by the designated coordinates receiving means.

The predetermined processing may include first processing that uses the X-coordinate value of the designated coordinates and second processing that uses the Y-coordinate value of the designated coordinates. When the area determination means has determined that the designated coordinates belong to the first designation area, the first processing means may perform the first processing by using the X-coordinate value of the designated coordinates received by the designated coordinates receiving means, and perform the second processing by using the Y-coordinate value of the designated coordinates. When the area determination means has determined that the designated coordinates belong to the second designation area, the second processing means may perform only one of the first processing and the second processing, by using only one of the X-coordinate value and the Y-coordinate value of the designated coordinates received by the designated coordinates receiving means.

The information processing program may further cause the computer to act as start designated coordinates determination means for determining whether or not the designated coordinates received by the designated coordinates receiving means are designated coordinates that have been designated first among a series of designated coordinates received by the designated coordinates receiving means (hereinafter, referred to as start designated coordinates). When the area determination means has determined that the start designated coordinates belong to the first designation area, the first processing means may perform the predetermined processing by using a direction that is based on a series of designated coordinates that are received by the designated coordinates receiving means after the area determination means has made the determination. When the area determination means has determined that the start designated coordinates belong to the second designation area, the second processing means may perform the predetermined processing by using a direction that is a result of correcting a direction, which is based on a series of designated coordinates that are received by the designated coordinates receiving means after the area determination means has made the determination, so as to extend along a predetermined direction. Accordingly, in the case where current designated coordinates are outside the first designation area or the second designation area, to which the start designated coordinates have previously belong, processing that is against the user's intention can be prevented from being performed.

The information processing program may be stored in any type of computer-readable storage medium (e.g., flexible disc, hard disk, optical disc, magneto-optical disk, CD-ROM, CD-R, magnetic tape, nonvolatile semiconductor memory card, ROM, or the like).

An information processing system of the present invention is capable of receiving an input from a pointing device that is capable of designating an arbitrary position in a multidimensional designation area. The information processing system includes designated coordinates receiving means, area determination means, first processing means, and second processing means. The designated coordinates receiving means repeatedly receives designated coordinates that indicate a position, in the designation area, designated by the pointing device. The area determination means determines whether or not the designated coordinates received by the designated coordinates receiving means belong to a first designation area in the designation area, and determines whether or not the designated coordinates received by the designated coordinates receiving means belong to a second designation area in the designation area. When the area determination means has determined that the designated coordinates belong to the first designation area, the first processing means performs predetermined processing by using a direction that is based on the designated coordinates received by the designated coordinates receiving means. When the area determination means has determined that the designated coordinates belong to the second designation area, the second processing means performs the predetermined processing by using a direction that is a result of correcting the direction, which is based on the designated coordinates received by the designated coordinates receiving means, so as to extend along a predetermined direction.

The information processing system may be structured as a single information processing apparatus, or may be structured with a plurality of information processing apparatuses.

An information processing method of the present invention is a method for processing an input from a pointing device that is capable of designating an arbitrary position in a multidimensional designation area. The information processing method includes a designated coordinates receiving step, an area determination step, a first processing step, and a second processing step. The designated coordinates receiving step repeatedly receives designated coordinates that indicate a position, in the designation area, designated by the pointing device. The area determination step determines whether or not the designated coordinates received at the designated coordinates receiving step belong to a first designation area in the designation area, and determines whether or not the designated coordinates received at the designated coordinates receiving step belong to a second designation area in the designation area. When the area determination step has determined that the designated coordinates belong to the first designation area, the first processing step performs predetermined processing by using a direction that is based on the designated coordinates received at the designated coordinates receiving step. When the area determination step has determined that the designated coordinates belong to the second designation area, the second processing step performs the predetermined processing by using a direction that is a result of correcting the direction, which is based on the designated coordinates received at the designated coordinates receiving step, so as to extend along a predetermined direction.

The present invention realizes both a free operation and a precise operation that use a pointing device.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
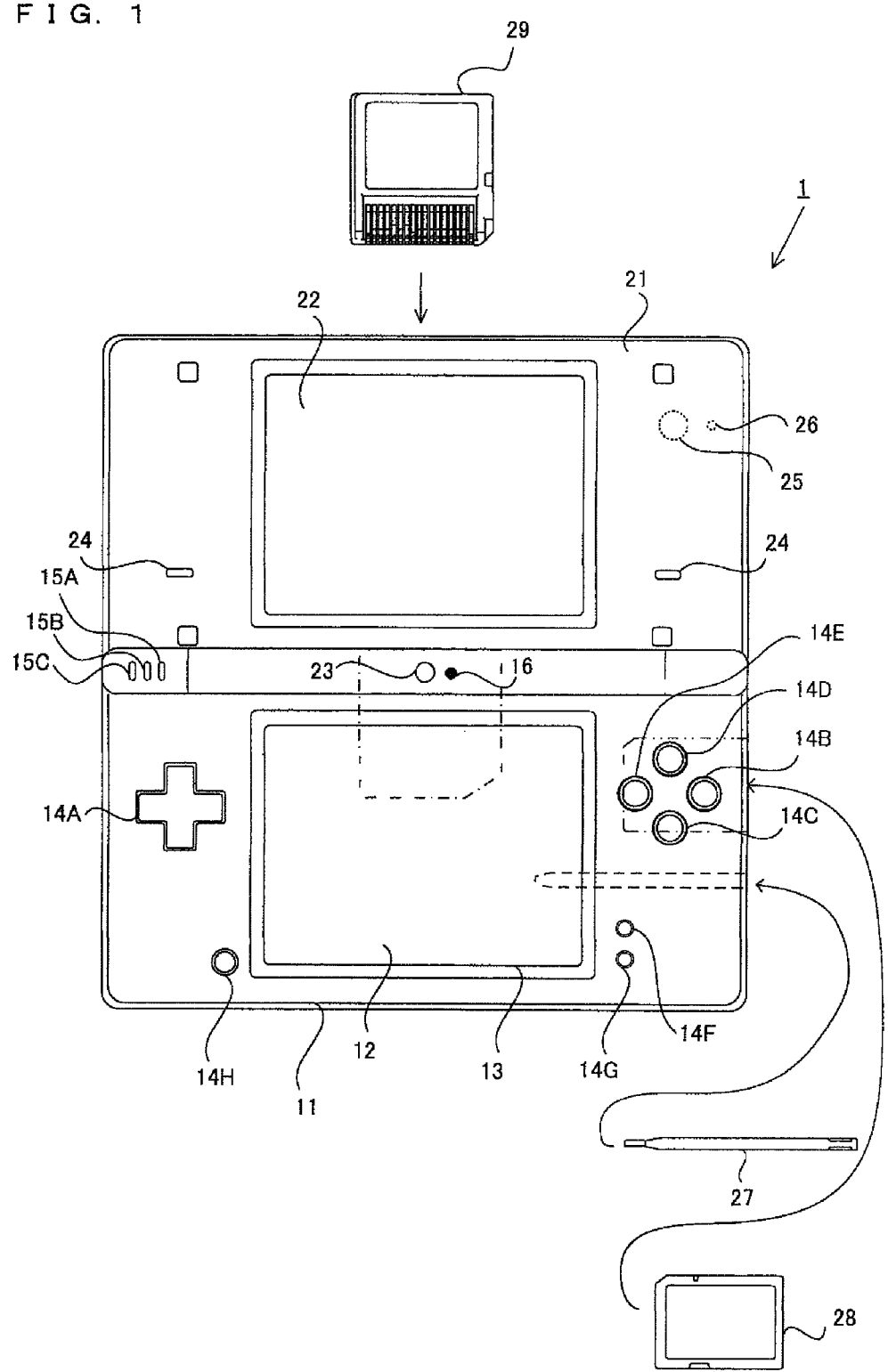
FIG. 1 is an external view of a game apparatus 1.

Hereinafter, a game apparatus according to an embodiment of the present invention will be described with reference to the accompanying drawings. FIG. 1 is an external view of a game apparatus 1. Note that the game apparatus 1 has cameras incorporated therein. Accordingly, the game apparatus 1 also functions as an imaging apparatus capable of taking images with the cameras, displaying the taken images on a screen, and saving data of the taken images.

FIG. 1 shows the game apparatus 1 which is a foldable handheld game apparatus and which is in an opened state. The game apparatus 1 has a size that allows a user to hold it with their one or both hands even when the game apparatus 1 is in the opened state.

The game apparatus 1 includes a lower housing 11 and an upper housing 21. The lower housing 11 and the upper housing 21 are connected to each other in a manner that allows them to be opened and closed (i.e., foldable). In the example of FIG. 1, the lower housing 11 and the upper housing 21 are each formed in a plate-like shape of a horizontally long rectangle, and are rotatably connected at their longer sides. Normally, the user uses the game apparatus 1 in the opened state. When not using the game apparatus 1, the user keeps the game apparatus 1 in the closed state. In the example of FIG. 1, the state of the game apparatus 1 is not limited to the opened or closed state. With friction force occurring at the connection between the lower housing 11 and the upper housing 21, the game apparatus 1 can be maintained to be in an intermediate state between the opened state and the closed state, at any angle formed by the lower housing 11 and the upper housing 21. In other words, the upper housing 21 can be caused to remain stationary at any angle with respect to the lower housing 11.

In the lower housing 11, a lower LCD (Liquid Crystal Display) 12 is provided. The lower LCD 12 has a horizontally long shape, and is arranged such that the orientation of the longer sides thereof coincides with the orientation of the longer sides of the lower housing 11. Although the LCD is used as a display device to be incorporated in the game apparatus 1 in the present embodiment, any other display device, such as a display device using an EL (Electro Luminescence), may be used, for example. In the game apparatus 1, a display device having any resolution may be used.

Operation buttons 14A to 14H and a touch panel 13 are provided on the lower housing 11 as input devices. As shown in FIG. 1, a direction input button 14A, an operation button 14B, an operation button 14C, an operation button 14D, an operation button 14E, a start button 14F, a select button 14G, and a power button 14H, are provided on an inner main surface of the lower housing 11, which inner main surface is, when the upper housing 21 and the lower housing 11 are closed, accommodated within the game apparatus 1. A particular function is appropriately assigned to each of these operation buttons 14A to 14G in accordance with a game program that is executed by the game apparatus 1. The power button 14F is used to power ON/OFF the game apparatus 1. In the example of FIG. 1, the direction input button 14A and the power button 14H are provided on the inner main surface of the lower housing 11, so as to be located to the right or left (to the left, in FIG. 1) of the lower LCD 12 that is provided near the center of the inner main surface. The operation buttons 14B to 14E, the start button 14F, and the select button 14G are provided on the inner main surface of the lower housing 11, so as to be located to the other side (to the right, in FIG. 1) of the lower LCD 12.

Note that the game apparatus 1 is further provided with other operation buttons that are not shown in FIG. 1. For example, an L-button is provided on a left end portion of an upper side surface of the lower housing 11, and an R-button is provided on a right end portion of the upper side surface of the lower housing 11. The L-button and the R-button are also each assigned with an appropriate function in accordance with the game program executed by the game apparatus 1. Moreover, a sound volume button is provided on a left side surface of the lower housing 11. The sound volume button is used to adjust the sound volume of a loudspeaker included in the game apparatus 1.

The game apparatus 1 further includes the touch panel 13 as an input device, in addition to the operation buttons 14A to 14H. In the present embodiment, the touch panel 13 is a resistive film type touch panel that is mounted so as to cover the screen of the lower LCD 12. The user can perform an input on an input surface of the touch panel 13 through a touch operation, for example, by touching the input surface with a stylus pen 27 or with the user's finger. When a touch operation is performed on the input surface, the touch panel 13 generates a voltage that indicates a touch position. The voltage generated by the touch panel 13 is, as described below, converted by an I/F circuit 42 into touch position data that indicates the touch position in the form of X-Y coordinates on the touch panel 13.

In the right side surface of the lower housing 11, an insertion opening (indicated by a two-dot chain line in FIG. 1) is further provided for accommodating a memory card 28. Inside the insertion opening, a connector (not shown) is provided for electrically connecting the game apparatus 1 and the memory card 28. The memory card 28 is, for example, an SD (Secure Digital) memory card, and detachably attached to the connector. The memory card 28 is used, for example, for storing (saving) an image taken by the game apparatus 1, and loading an image generated by another apparatus into the game apparatus 1.

In the right side surface of the lower housing 11, an insertion opening for accommodating the stylus pen 27 is also provided as indicated by a dashed line in FIG. 1.

Further, in the upper side surface of the lower housing 11, an insertion opening (indicated by a dashed-dotted line in FIG. 1) is provided for accommodating a memory card 29. Inside the insertion opening, a connector (not shown) is provided for electrically connecting the game apparatus 1 and the memory card 29. The memory card 29 is a storage medium in which an information processing program, a game program, or the like is stored, and the memory card 29 is detachably inserted into the insertion opening provided in the lower housing 11.

Three LEDs (Light Emitting Diodes) 15A to 15C are mounted at the left side portion of the connection between the lower housing 11 and the upper housing 21. Here, the game apparatus 1 is capable of performing wireless communication with other apparatuses. The first LED 15A is lit up while the wireless communication is being established. The second LED 15B is lit up while the game apparatus 1 is being charged. The third LED 15C is lit up while the power of the game apparatus 1 is ON. Thus, the three LEDs 15A to 15C allow the user to be informed of a state of communication establishment of the game apparatus 1, a state of charge of the game apparatus 1, and a state of ON/OFF of the power of the game apparatus 1.

Meanwhile, in the upper housing 21, an upper LCD 22 is provided. The upper LCD 22 has a horizontally long shape, and is arranged such that the orientation of the longer sides thereof coincides with the orientation of the longer sides of the upper housing 21. Similarly to the lower LCD 12, a display device of any type different from that of the upper LCD 22, or a display device having any resolution different from that of the upper LCD 22, may be used instead of the upper LCD 22. A touch panel may be provided so as to cover the upper LCD 22.

In the upper housing 21, two cameras (an inner camera 23 and an outer camera 25) are provided. As shown in FIG. 1, the inner camera 23 is mounted at an inner main surface of the upper housing 21, in the vicinity of the aforementioned connection. On the other hand, the outer camera 25 is mounted on a surface reverse to the inner main surface on which the inner camera 23 is mounted, that is, on the outer main surface of the upper housing 21 (which is a surface to be located at the outside of the game apparatus 1 when the game apparatus 1 is in the closed state and which is the back surface of the upper housing 21 shown in FIG. 1). In FIG. 1, the outer camera 25 is indicated by a dashed line. With the above arrangement, the inner camera 23 is capable of taking an image of a view in a direction in which the inner main surface of the upper housing 21 faces, and the outer camera 25 is capable of taking an image of a view in a direction opposite to an imaging direction of the inner camera 23, that is, a view in a direction in which the outer main surface of the upper housing 21 faces. In this manner, in the present embodiment, the two cameras, that is, the inner camera 23 and the outer camera 25, are provided such that the imaging directions thereof are opposite to each other. For example, the user can take, by using the inner camera 23, an image of a view that is seen from the game apparatus 1 in the direction of the user's side. Also, the user can take, by using the outer camera 25, an image of a view that is seen from the game apparatus 1 in the direction opposite to the user. The lower LCD 12 and/or the upper LCD 22 may be used for displaying in real time images being taken by the inner camera 23 or the outer camera 25.

In the inner main surface of the upper housing 21, near the aforementioned connection, a microphone (a microphone 43 shown in FIG. 2) is accommodated as a sound input device. Also, in the inner main surface, near the connection, a microphone hole 16 is formed to allow the microphone 43 to detect a sound outside the game apparatus 1. The accommodating position of the microphone 43 and the position of the microphone hole 16 may not necessarily be located near the connection. For example, the microphone 43 may be accommodated in the lower housing 11, and the microphone hole 16 may be provided in the lower housing 11 so as to correspond to the accommodating position of the microphone 43.

On the outer main surface of the upper housing 21, a fourth LED 26 (indicated by a dashed line in FIG. 1) is mounted. The fourth LED 26 is lit up while photographing is being performed by using the inner camera 23 or the outer camera 25. Further, the fourth LED 26 may be caused to blink while a moving picture is taken by the inner camera 23 or the outer camera 25 (i.e., while images taken by the camera are being stored as a moving picture). The fourth LED 26 may be turned OFF at the instant of the shutter being pressed, and then kept OFF until an image taken at the instant has been stored, so as to prevent glare, in the image, of the light emitted from the fourth LED 26. When photographing is being performed using the game apparatus 1, the fourth LED 26 allows a photographing subject and people in the surroundings to be notified of the photographing.

Sound holes 24 are formed in the inner main surface of the upper housing 21, to both the right and left of the upper LCD 22 that is provided near the center of the inner main surface. Speakers are accommodated in the upper housing 21 at the back of the sound holes 24, respectively. The sound holes 24 are holes for releasing sounds generated by the speakers to the outside of the game apparatus 1.

As described above, the inner camera 23 and the outer camera 25 which are provided for taking images, and the upper LCD 22 which is display means for displaying various images, are provided in the upper housing 21. Whereas, the input devices (the touch panel 13 and the buttons 14A to 14H) with which to perform operation inputs on the game apparatus 1, and the lower LCD 12 which is display means for displaying various images, are provided in the lower housing 11. Accordingly, for example, the input devices can be used in such a manner as follows: when using the game apparatus 1, the user can hold the lower housing 11 and perform inputs via the input devices while looking at taken images (images taken by the cameras) displayed on the lower LCD 12 and the upper LCD 22.

Figure 2:
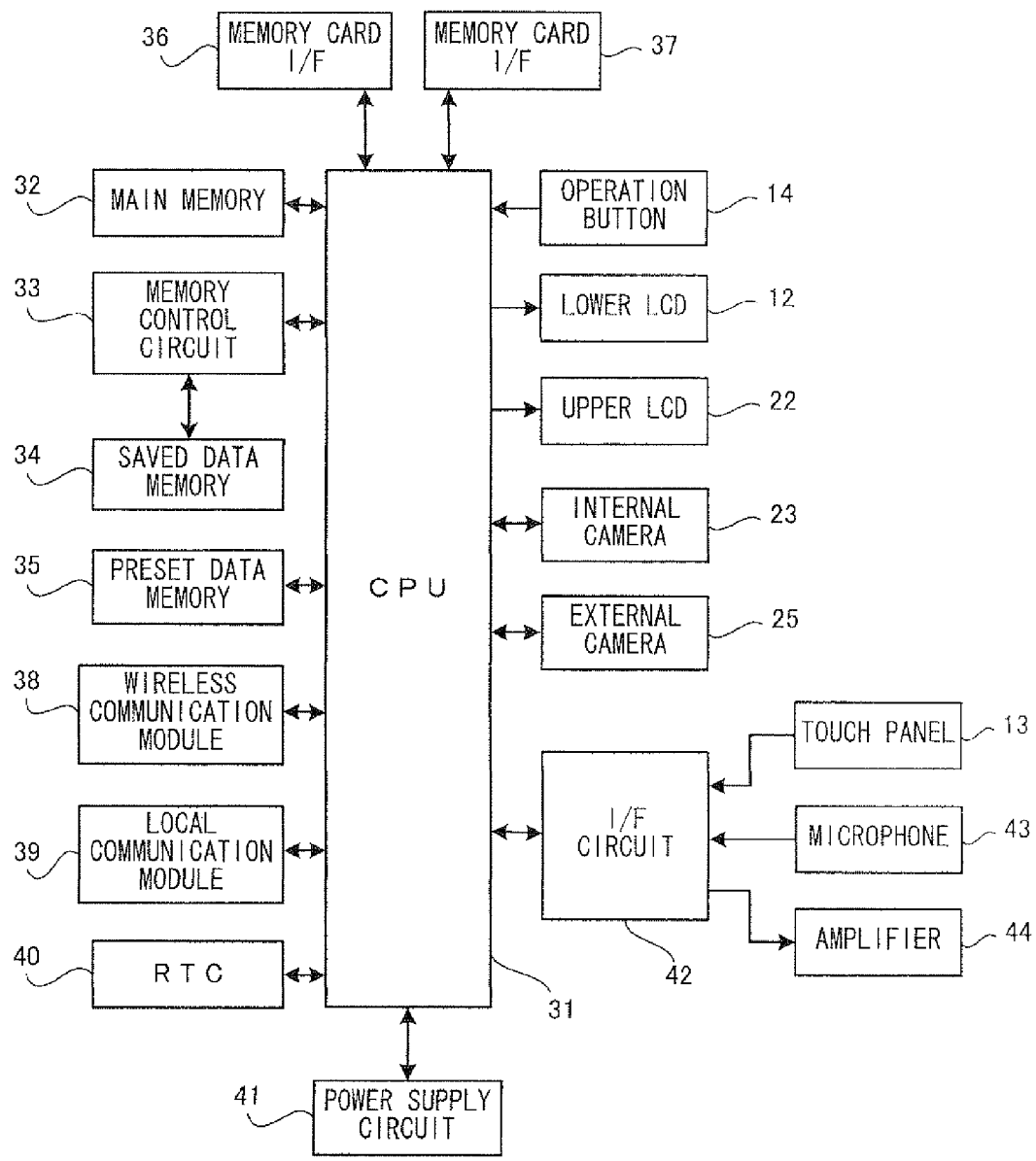
FIG. 2 is a block diagram showing an example of an internal configuration of the game apparatus 1.

Next, an internal configuration of the game apparatus 1 will be described with reference to FIG. 2. FIG. 2 is a block diagram showing an example of the internal configuration of the game apparatus 1.

As shown in FIG. 2, the game apparatus 1 includes electronic components such as a CPU (Central Processing Unit) 31, a main memory 32, a memory control circuit 33, a saved data memory 34, a preset data memory 35, memory card interfaces (memory card I/Fs) 36 and 37, a wireless communication module 38, a local communication module 39, a real time clock (RTC) 40, a power circuit 41, an interface circuit (I/F circuit) 42, and the like. These electronic components are mounted on an electronic circuit substrate and accommodated in the lower housing 11 (or in the upper housing 21).

The CPU 31 is information processing means for executing a predetermined program. In the present embodiment, the predetermined program is stored in a memory (e.g., the saved data memory 34) within the game apparatus 1 or in the memory card 28 and/or 29. The CPU 31 executes information processing described below by executing the predetermined program. Note that the program executed by the CPU 31 may be stored in advance in a memory within the game apparatus 1, or may be obtained from the memory card 28 and/or 29, or may be obtained from another apparatus through communication with this other apparatus.

The main memory 32, the memory control circuit 33, and the preset data memory 35 are connected to the CPU 31. The saved data memory 34 is connected to the memory control circuit 33. The main memory 32 is storage means used as a work area and a buffer area for the CPU 31. In other words, the main memory 32 stores various data used in the aforementioned information processing, and also stores a program obtained from the outside (e.g., from the memory cards 28 and 29, another apparatus, and the like). In the present embodiment, a PSRAM (Pseudo-SRAM) is used as the main memory 32, for example. The saved data memory 34 is storage means for storing the program to be executed by the CPU 31, data of images taken by the inner camera 23 and the outer camera 25, and the like. The saved data memory 34 is structured as a nonvolatile storage medium. In the present embodiment, the saved data memory 34 is structured as, for example, a NAND flash memory. The memory control circuit 33 is a circuit that controls reading and writing of data from and into the saved data memory 34 in accordance with instructions from the CPU 31. The preset data memory 35 is storage means for storing data (preset data), such as various parameters preset in the game apparatus 1. A flash memory connected to the CPU 31 via an SPI (Serial Peripheral Interface) bus can be used as the preset data memory 35.

The memory card I/Fs 36 and 37 are connected to the CPU 31. The memory card I/F 36 performs reading and writing of data from and into the memory card 28 attached to the connector, in accordance with instructions from the CPU 31. The memory card I/F 37 performs reading and writing of data from and into the memory card 29 attached to the connector, in accordance with instructions from the CPU 31. The present embodiment gives an example in which various programs stored in the memory card 29 are read and executed by the CPU 31.

The game program may be supplied to the computer system not only via the memory card 29 but also via an external storage medium such as the memory card 28. Alternatively, the game program may be supplied to the computer system through a wired or wireless communication line. Further alternatively, the game program of the present invention may be stored in advance in a nonvolatile storage device in the computer system. An information storage medium for storing the game program is not limited to the above nonvolatile storage device, but may be a CD-ROM, a DVD, or an optical disc-shaped storage medium similar to them.

The wireless communication module 38 has a function to connect to a wireless LAN, for example, by a method conformed to the standard of IEEE802.11.b/g. The local communication module 39 has a function to perform wireless communication with a game apparatus of the same type as that of the game apparatus 1 by a predetermined communication method. The wireless communication module 38 and the local communication module 39 are connected to the CPU 31. The CPU 31 is capable of transmitting/receiving data to/from other apparatuses via the Internet, by using the wireless communication module 38, and capable of transmitting/receiving data to/from other game apparatuses of the same type as that of the game apparatus 1, by using the local communication module 39.

The RTC 40 and the power supply circuit 41 are connected to the CPU 31. The RTC 40 counts time, and outputs the result to the CPU 31. For example, the CPU 31 is capable of calculating a current time (date) or the like based on the time counted by the RTC 40. The power supply circuit 41 controls power supplied from a power source (typically, a battery accommodated in the lower housing 11) of the game apparatus 1 to supply the power to each component of the game apparatus 1.

The game apparatus 1 includes the microphone 43 and an amplifier 44. The microphone 43 and the amplifier 44 are connected to the I/F circuit 42. The microphone 43 detects a voice uttered by a user in the direction of the game apparatus 1, and outputs sound signals indicative of the voice to the I/F circuit 42. The amplifier 44 amplifies the sound signals outputted from the I/F circuit 42, and causes the speakers (not shown) to output the amplified signals. The I/F circuit 42 includes a sound control circuit for controlling the microphone 43 and the amplifier 44. The I/F circuit 42 performs, for example, A/D conversion on sound signals outputted from the microphone 43 so as to convert the sound signals into sound data of a predetermined format, and D/A conversion on sound data generated by the CPU 31 so as to generate sound signals to be outputted to the amplifier 44.

The I/F circuit 42 further includes a touch panel control circuit connected to the touch panel 13. Based on the voltage generated by the touch panel 13, the touch panel control circuit generates touch position data that indicates a touch position on the touch panel 13 in the form of X-Y coordinate values.

Operation buttons 14 include the above-described operation buttons 14A to 14H, and are connected to the CPU 31. The operation buttons 14 output, to the CPU 31, signals each indicating an input state of a corresponding one of the operation buttons 14A to 14H (i.e., indicating whether or not the corresponding button is being pressed). The CPU 31 obtains the signals outputted from the operation buttons 14, and executes processing in accordance with inputs that have been performed via the operation buttons 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. For example, the CPU 31 instructs one of the inner camera 23 and the outer camera 25 to take an image, and the camera which has received the instruction takes an image and sends image data to the CPU 31.

The lower LCD 12 and the upper LCD 22 are connected to the CPU 31. Each of the lower LCD 12 and the upper LCD 22 displays an image thereon in accordance with an instruction from the CPU 31. For example, the CPU 31 causes the lower LCD 12 and/or the upper LCD 22 to display an image (for example, a game image) generated by the game program being executed. As another example, the CPU 31 causes one of the lower LCD 12 and the upper LCD 22 to display an image obtained from one of the inner camera 23 and the outer camera 25, and causes the other one of the lower LCD 12 and the upper LCD 22 to display an operation explanation screen that is generated through predetermined processing.

Figure 3A:
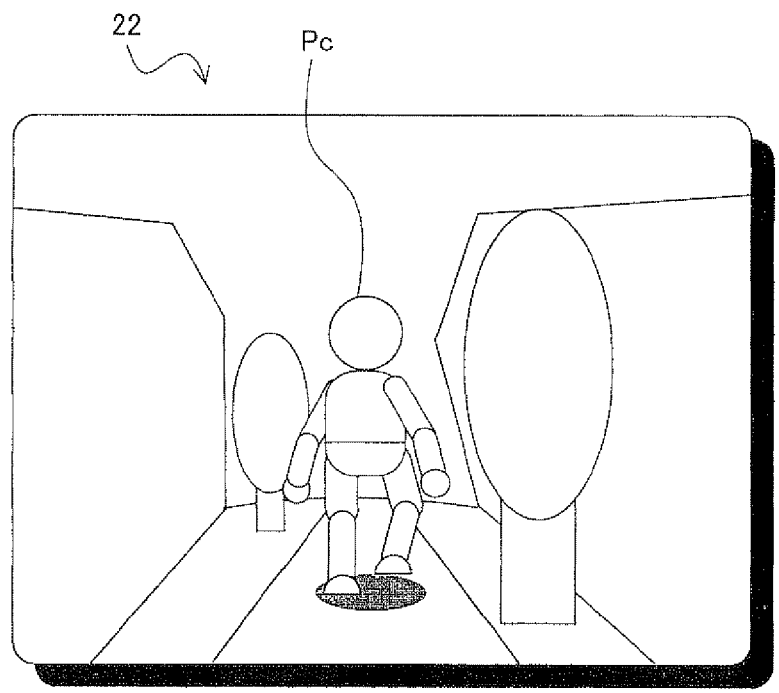
FIG. 3A shows an example of an image displayed on an upper LCD 22.
Figure 3B:
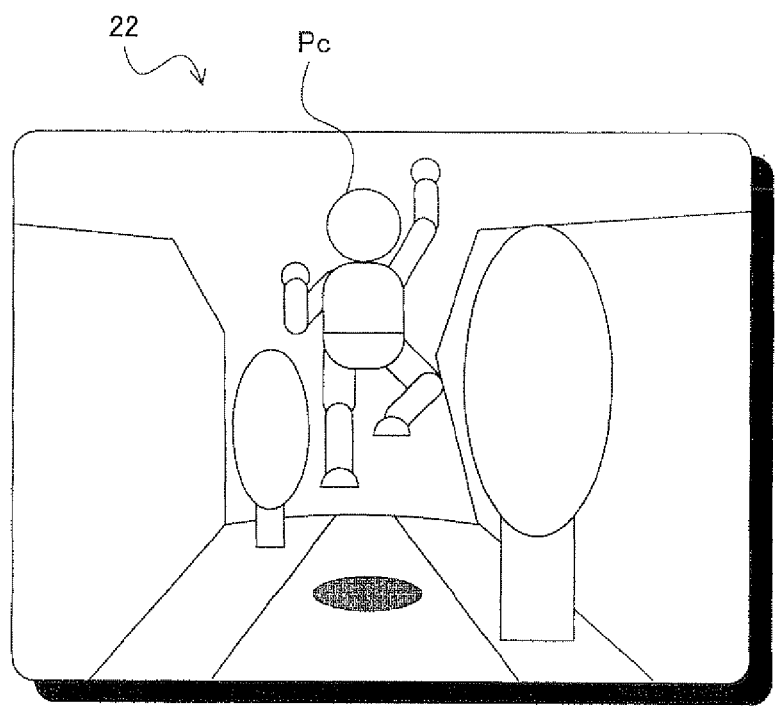
FIG. 3B shows another example of an image displayed on the upper LCD 22.
Figure 4:
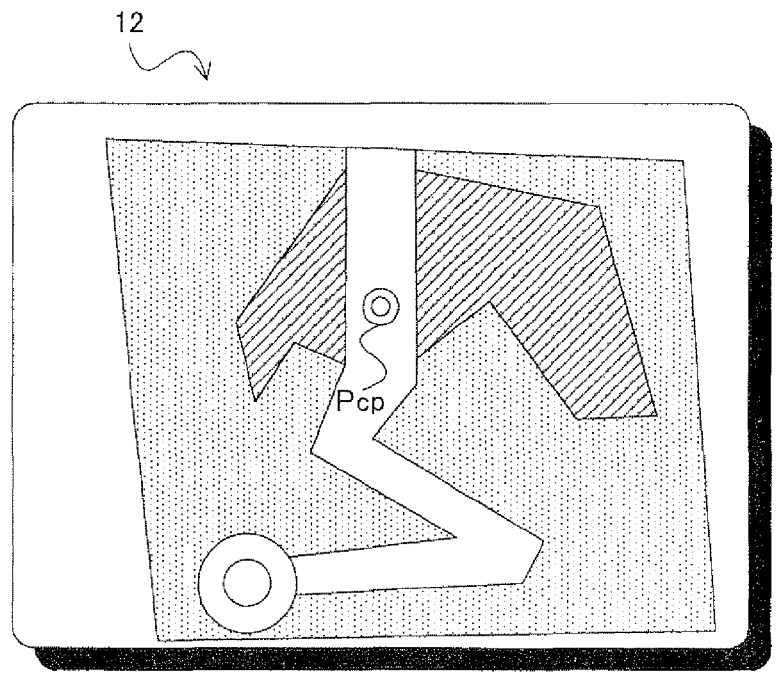
FIG. 4 shows an example of an image displayed on a lower LCD 12.

Next, with reference to FIGS. 3A to 4, game screens that are displayed on the lower LCD 12 and the upper LCD 22 by the game program being executed by the game apparatus 1, will be briefly described. First, a game image displayed on the upper LCD 22 will be described with reference to FIGS. 3A and 3B.

In a game executed in the present embodiment, a player character Pc placed in a virtual space performs actions in accordance with operations performed by a user. The player character Pc placed in the virtual space, which performs actions in accordance with operations performed by the user, is displayed on the upper LCD 22 of the game apparatus 1.

For example, for the game executed in the present embodiment, the game program assigns, to the direction input button 14A, a function of causing the player character Pc to move on the ground in accordance with a direction specified by an operation by the user. When the direction input button 14A is operated by the user, the player character Pc moves on the ground in accordance with a direction specified by the operated button.

FIG. 3A shows an example of a game image displayed on the upper LCD 22. For example, when the user operates a button which is included in the direction input button 14A and which causes the player character Pc to move forward (typically, an upward direction operation button), a game image is displayed as illustratively shown in FIG. 3A, which shows that the player character Pc moves in the forward direction (i.e., in the example shown in FIG. 3A, a direction in which the player character Pc advances toward the back of the virtual space).

The game program assigns, to each of the operation buttons 14B to 14H, a function of causing the player character Pc to jump, dash, or the like. Accordingly, for example, when an operation button among the operation buttons 14B to 14H, to which the game program assigns a function of causing the player character Pc to jump, is operated, the player character Pc jumps. FIG. 3B shows an example in which the upper LCD 22 displays a game image showing the player character Pc that is jumping.

Described next with reference to FIG. 4 is a game image displayed on the lower LCD 12. In the game executed in the present embodiment, as illustratively shown in FIG. 4, the lower LCD 12 displays a game image that includes: an image showing a map of an area in the virtual space, the area surrounding a position in which the player character Pc is present; and a current position of the player character Pc on the map. In the present embodiment, as illustratively shown in FIG. 4, a symbol Pcp representing the player character Pc in a schematic manner is displayed at the current position of the player character Pc on the map.

In this manner, the upper LCD 22 of the game apparatus 1 displays the player character Pc placed in the virtual space, and the lower LCD 12 displays the symbol Pcp representing the player character Pc, together with the map of the area surrounding the current position of the player character Pc. This allows the user, who is controlling the player character Pc while looking at the game image displayed on the upper LCD 22, to confirm, as necessary, the current position of the player character Pc which is displayed on the lower LCD 12.

Further, in the present embodiment, by performing the above-described touch operation on the touch panel 13, the user can control the position of a camera virtually placed in the virtual space (hereinafter, referred to as a virtual camera Ca), in order to cause the upper LCD 22 to display a game image. Described below with reference to FIGS. 5A to 12 is a camera position control process of the present embodiment for controlling the position of the virtual camera Ca in accordance with a touch operation performed by the user.

In the game executed in present embodiment, the aforementioned virtual camera Ca is placed in the virtual space. A game image, which is obtained when the virtual camera Ca takes an image in the virtual space, is calculated and generated. The generated game image is displayed on the upper LCD 22.

Figure 5A:
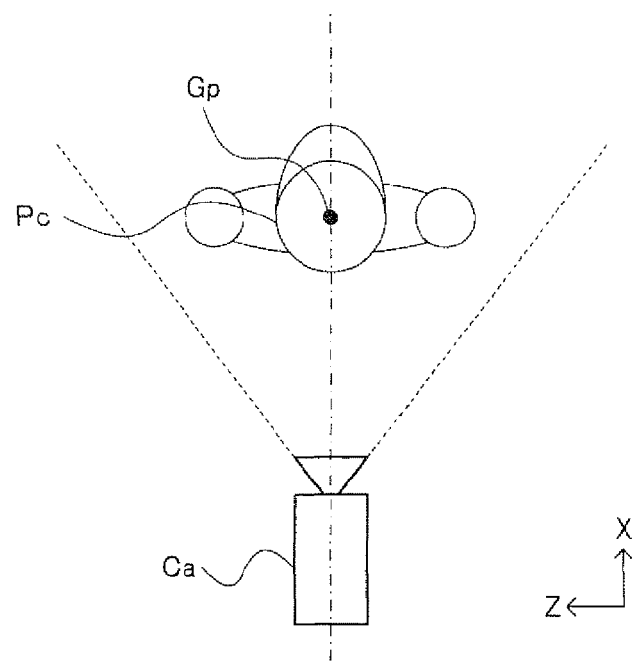
FIG. 5A shows a positional relationship between a player character and a virtual camera.
Figure 5B:
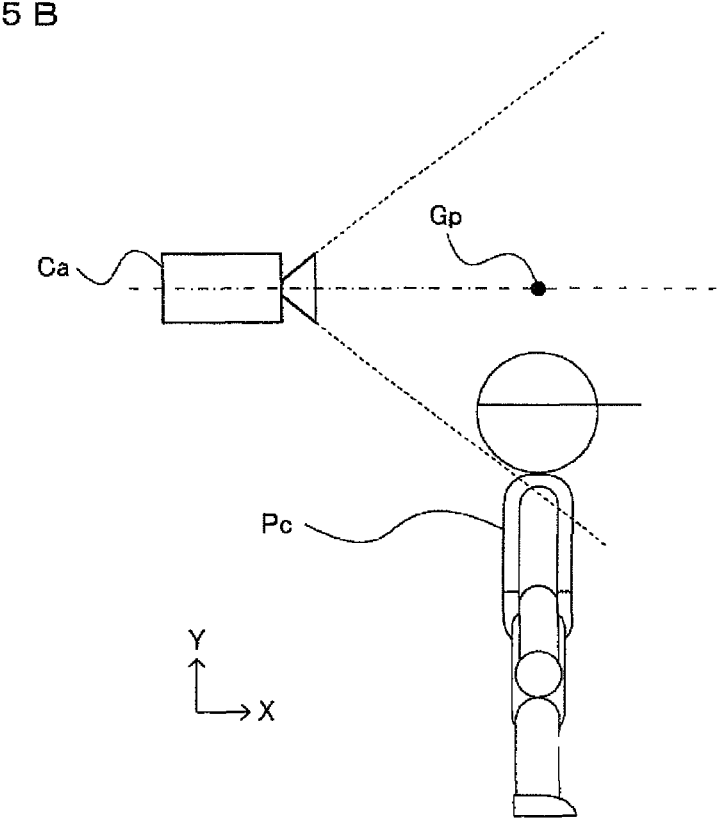
FIG. 5B shows a positional relationship between the player character and the virtual camera.

FIG. 5A is a plan view which is seen from right above the player character Pc and in which the player character Pc is looked down on in the vertical direction. The plan view shows a positional relationship between the virtual camera Ca and the player character Pc at a particular time point during the execution of the game of the present embodiment. FIG. 5B is a right side view, showing a positional relationship between the virtual camera Ca and the player character Pc shown in FIG. 5A, which is seen from the right side of the player character Pc and in which the player character Pc is seen in a Z-axis direction indicated in FIG. 5A.

It is assumed in the present embodiment that the virtual camera Ca always faces a gazing point GP. It is also assumed in the present embodiment that the gazing point GP is fixed at a position that is distant from the top of the head of the player character Pc by a predetermined distance in a Y-axis positive direction indicated in FIG. 5B. In the present embodiment, the user performs a touch operation on the touch panel 13, thereby controlling the position of the virtual camera Ca.

Figure 6:
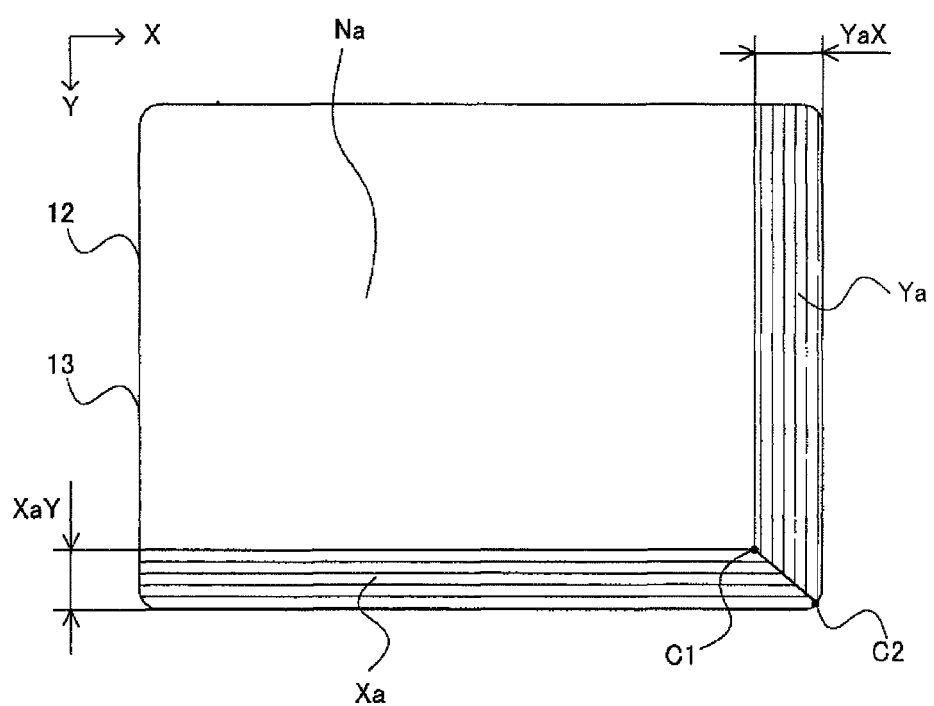
FIG. 6 shows an example of input areas on a touch panel.

FIG. 6 shows an example of areas on the touch panel 13, which are defined in advance in the present embodiment. As shown in FIG. 6, in the present embodiment, the entire area on the touch panel 13 is divided into three areas that are a free direction input area Na, a lateral direction input area Xa, and a longitudinal direction input area Ya. The present embodiment defines, as the lateral direction input area Xa, a predetermined area shown in FIG. 6 which has a width XaY, the predetermined area extending from the end of a Y-axis positive direction side of the touch panel 13 (typically, the end closer to the user who is playing the game by using the game apparatus 1) toward the Y-axis negative direction. The present embodiment also defines, as the longitudinal direction input area Ya, a predetermined area shown in FIG. 6 which has a width YaX, the predetermined area extending from the end of an X-axis positive direction side of the touch panel 13 (typically, the end located to the right of the user who is playing the game by using the game apparatus 1) toward the X-axis negative direction. Further, the present embodiment defines, as the free direction input area Na, an area on the touch panel 13, which is different from both the lateral direction input area Xa and the longitudinal direction input area Ya. In the present embodiment, boundaries among these input areas are not displayed on the lower LCD 12 as is clear from FIG. 4. However, as an alternative, such boundaries or the like may be displayed so as to allow the user to identify these input areas.

Note that it is assumed in the present embodiment that the boundary between the lateral direction input area Xa and the longitudinal direction input area Ya is, as illustratively shown in FIG. 6, a straight line that connects a position C1 and a position C2.

First, a case where the user performs a touch operation on the free direction input area Na on the touch panel 13 to control the position of the virtual camera Ca, will be described. Note that, in FIG. 6, a game screen displayed on the lower LCD 12, which is visible through the transparent touch panel 13, is not shown for the sake of convenience in the description.

Figure 7A:
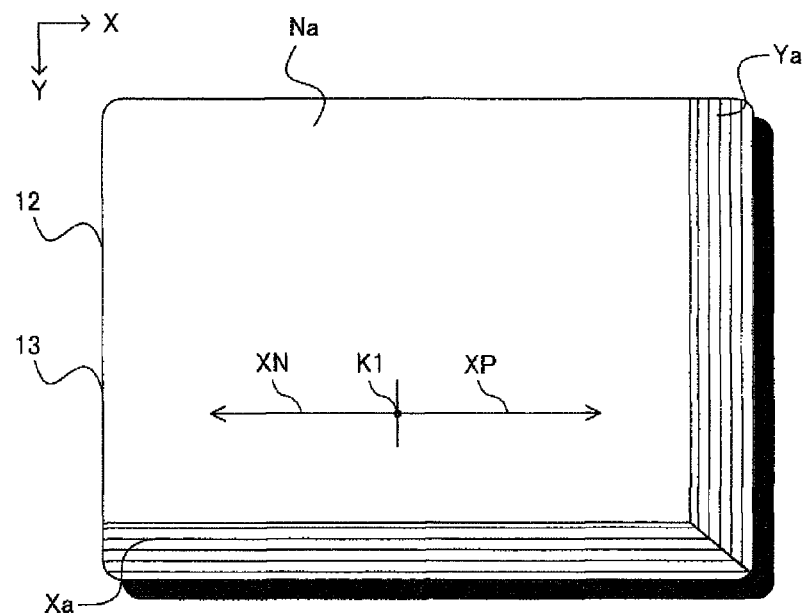
FIG. 7A shows an example of tracks of touch positions.
Figure 7B:
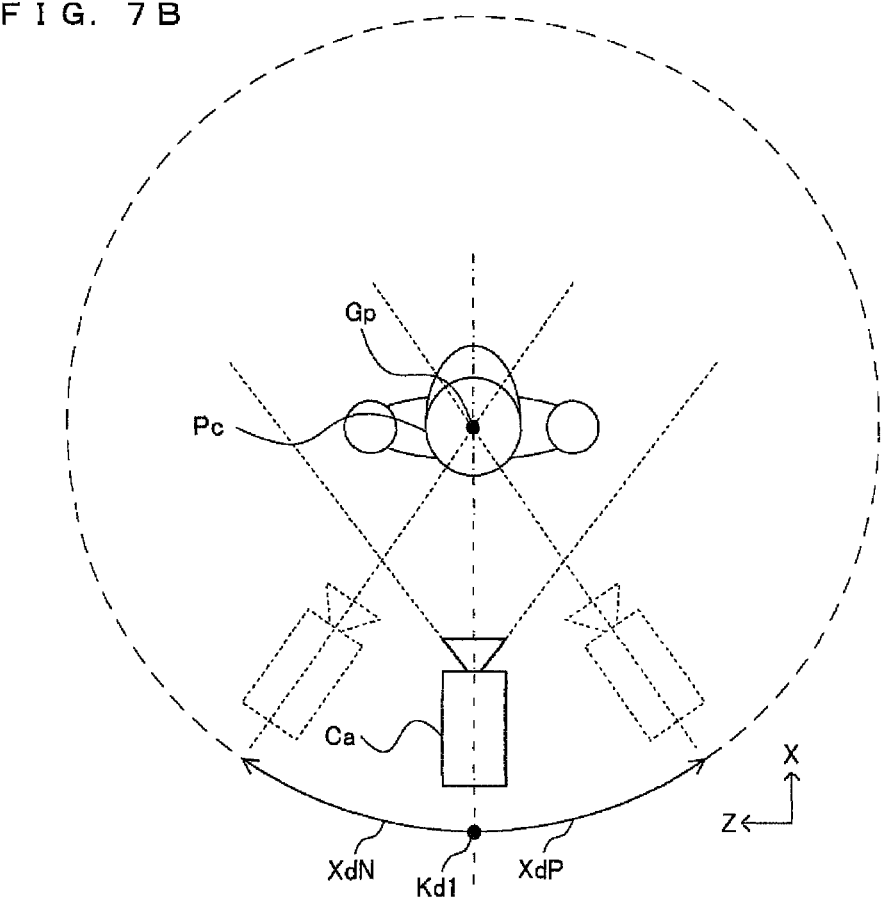
FIG. 7B shows an example of tracks of movements of the virtual camera.

FIG. 7A shows an example of tracks of changes in a touch position. These tracks are each obtained when the user has performed a touch operation in which the user moves the stylus pen 27, while keeping touching the touch panel 13 with the stylus pen 27, along the X-axis on the touch panel 13 shown in FIG. 7A from an arbitrary position K1 located in the free direction input area Na on the touch panel 13 (i.e., a slide operation). FIG. 7B shows an example of tracks of movements of the virtual camera Ca. These tracks are each obtained when the user has moved the stylus pen 27 as shown in FIG. 7A.

In the present embodiment, if the user changes the touch position from the arbitrary position K1 located in the free direction input area Na toward an X-axis positive direction XP on the touch panel 13 as shown in FIG. 7A, then the virtual camera Ca is, as shown in FIG. 7B, moved to a position that has been rotated, by a rotational angle corresponding to the amount of change in the touch position, from a current position Kd1 toward a counterclockwise direction XdP corresponding to the X-axis positive direction XP on the touch panel 13, with respect to a vertical line passing through the gazing point GP (i.e., with respect to a straight line which passes through the gazing point GP and which is in parallel with the Y-axis in the virtual space). Whereas, in the present embodiment, if the user changes the touch position from the arbitrary position K1 located in the free direction input area Na toward an X-axis negative direction XN on the touch panel 13 as shown in FIG. 7A, then the virtual camera Ca is, as shown in FIG. 7B, moved to a position that has been rotated, by a rotational angle corresponding to the amount of change in the touch position, from the current position Kd1 toward a clockwise direction XdN corresponding to the X-axis negative direction XN on the touch panel 13, with respect to the vertical line passing through the gazing point GP (i.e., with respect to the straight line which passes through the gazing point GP and which is in parallel with the Y-axis in the virtual space).

Note that, when the virtual camera Ca is moved along a horizontal plane as shown in FIG. 7B, the orientation of the virtual camera Ca is controlled such that, as described above, the virtual camera Ca always faces the gazing point GP.

In the description below, calculation of the position and orientation of the virtual camera Ca when the virtual camera Ca is moved along the horizontal plane as illustratively shown in FIG. 7B, is referred to as "horizontal movement position calculation" for the virtual camera Ca.

Figure 8A:
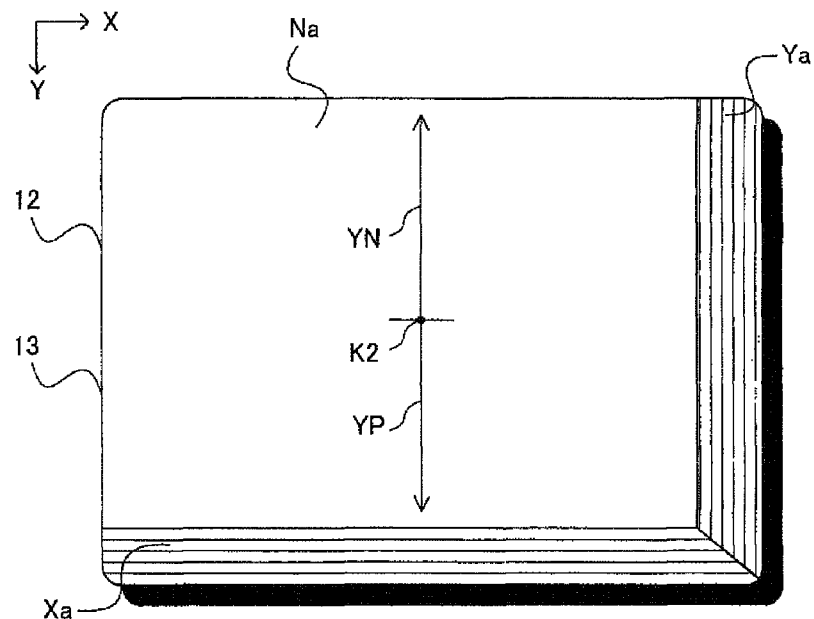
FIG. 8A shows another example of tracks of touch positions.
Figure 8B:
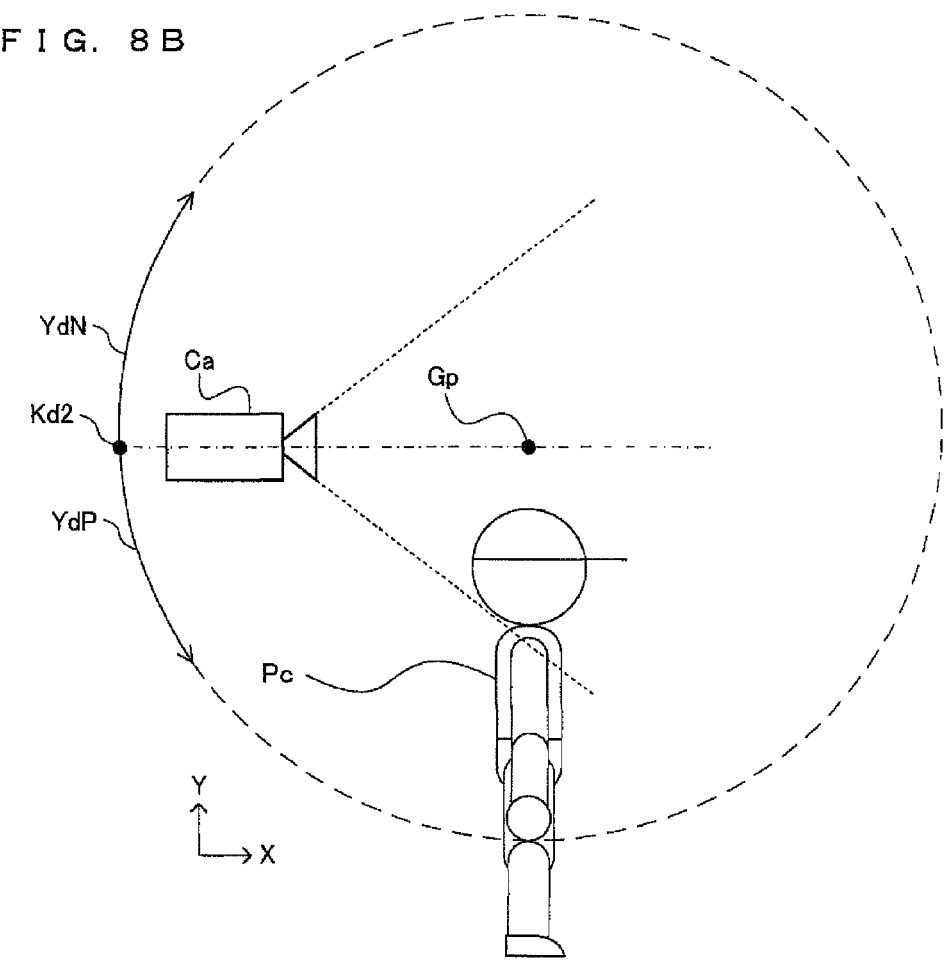
FIG. 8B shows another example of tracks of movements of the virtual camera.

FIG. 8A shows an example of tracks of changes in a touch position. These tracks are each obtained when the user has performed a touch operation in which the user moves the stylus pen 27, while keeping touching the touch panel 13 with the stylus pen 27, along the Y-axis on the touch panel 13 shown in FIG. 8A from an arbitrary position K2 located in the free direction input area Na on the touch panel 13 (i.e., a slide operation). FIG. 8B shows an example of tracks of movements of the virtual camera Ca. These tracks are each obtained when the user has moved the stylus pen 27 as shown in FIG. 8A.

In the present embodiment, if the user changes the touch position from the arbitrary position K2 located in the free direction input area Na toward a Y-axis negative direction YN on the touch panel 13 as shown in FIG. 8A, then the virtual camera Ca is, as shown in FIG. 8B, moved to a position that has been rotated, by a rotational angle corresponding to the amount of change in the touch position, from a current position Kd2 toward a clockwise direction YdN corresponding to the Y-axis negative direction YN on the touch panel 13, with respect to the gazing point GP along a vertical plane that includes the current position Kd2 and the gazing point GP. Whereas, in the present embodiment, if the user changes the touch position from the arbitrary position K2 located in the free direction input area Na toward a Y-axis positive direction YP on the touch panel 13 as shown in FIG. 8A, then the virtual camera Ca is, as shown in FIG. 8B, moved to a position that has been rotated, by a rotational angle corresponding to the amount of change in the touch position, from the current position Kd2 toward a counterclockwise direction YdP corresponding to the Y-axis positive direction YP on the touch panel 13, with respect to the gazing point GP along the vertical plane that includes the current position Kd2 and the gazing point GP.

Note that when the virtual camera Ca is moved along the vertical plane as shown in FIG. 8B, the orientation of the vertical camera Ca is controlled such that, as described above, the virtual camera Ca always faces the gazing point GP.

In the description below, calculation of the position and orientation of the virtual camera Ca when the virtual camera Ca is moved along the vertical plane as illustratively shown in FIG. 8B, is referred to as "vertical movement position calculation" for the virtual camera Ca.

Figure 9:
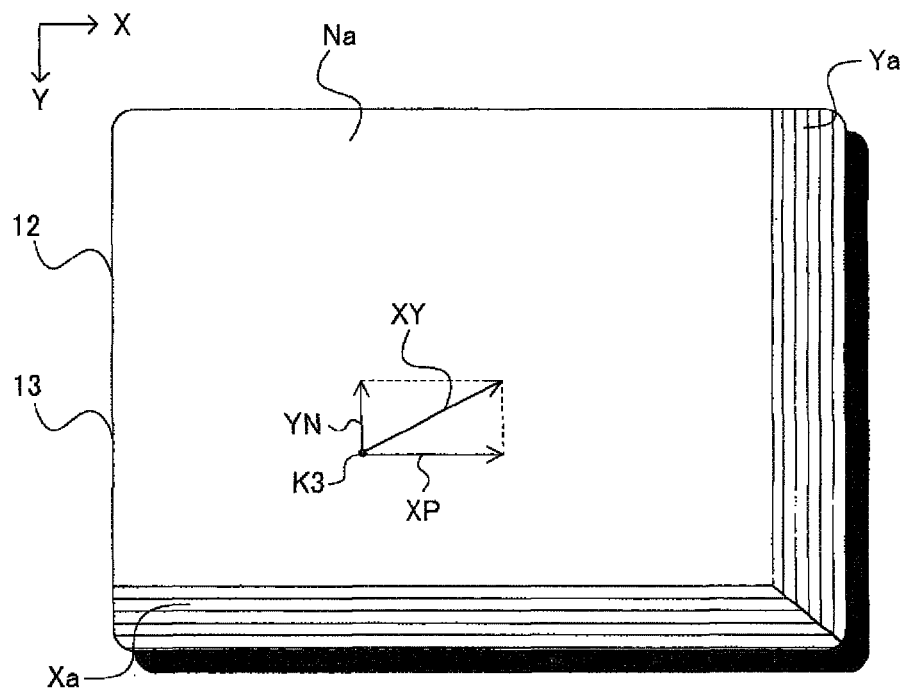
FIG. 9 shows another example of a track of touch positions.
Figure 10:
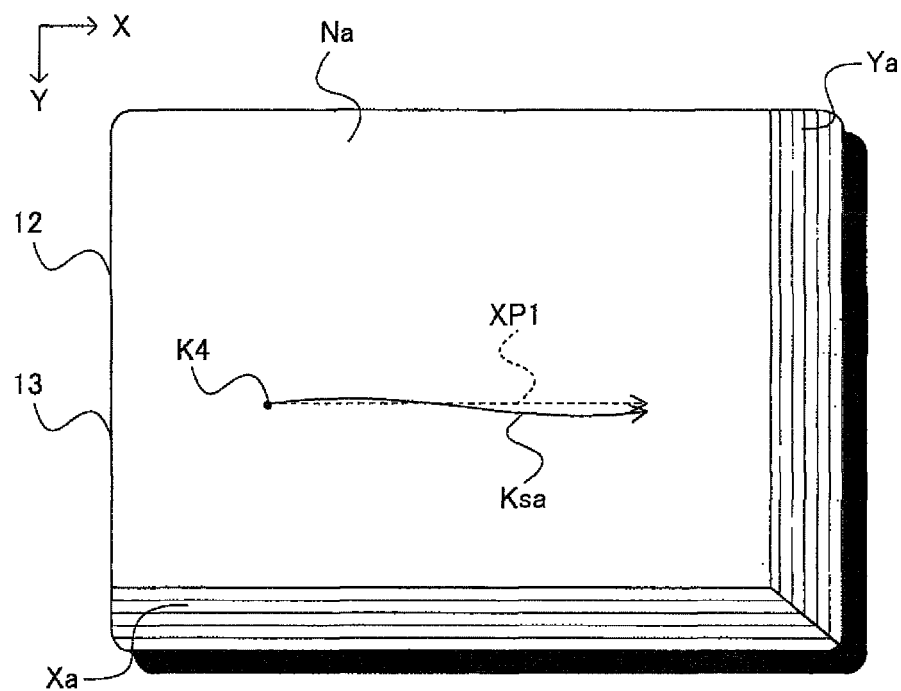
FIG. 10 shows an example of a track of touch positions in a free direction input area Na.

In the present embodiment, there is a case where, for example, the user changes a touch position in an arbitrary direction that is different from both a direction extending along the X-axis on the touch panel 13 and a direction extending along the Y-axis on the touch panel 13. FIG. 9 shows an example of a track of changes in a touch position. The track is obtained when the user has changed the touch position from an arbitrary position K3 located in the free direction input area Na toward an arbitrary direction XY.

In the present embodiment, if the user has changed, as illustratively shown in FIG. 9, the touch position from the arbitrary position K3 along the arbitrary direction XY that different from both the direction extending along the X-axis on the touch panel 13 and the direction extending along the Y-axis on the touch panel 13, then the position of the virtual camera Ca is controlled in accordance with the amount of change, occurring at the time, in the touch position along the X- and Y-axes on the touch panel 13. To be specific, the aforementioned horizontal movement position calculation for the virtual camera Ca is performed in accordance with the amount of change in the touch position along the X-axis, the change having occurred when the touch position has been changed along the arbitrary direction XY from the arbitrary position K3. Then, the position and orientation of the virtual camera Ca are updated, accordingly. Next, the vertical movement position calculation is performed in accordance with the amount of change in the touch position along the Y-axis, the change having occurred when the touch position has been changed along the arbitrary direction XY from the arbitrary position K3. Then, the position and orientation of the virtual camera Ca are further updated, accordingly.

Accordingly, in the present embodiment, by changing the touch position in an arbitrary direction from an arbitrary position located in the free direction input area Na, the user can control the position of the virtual camera Ca to be moved to an arbitrary position, and thereby move a viewpoint, which is used to generate a game image to be displayed on the upper LCD 22, to a desired position.

As described above with reference to FIGS. 7A to 8B, when the touch position is changed in a direction that precisely coincides with an X-axis direction or a Y-axis direction on the touch panel 13, the virtual camera Ca is moved precisely along the horizontal plane or the vertical plane in the virtual space. However, for example, even if the user intends to change the touch position in a direction that precisely coincides with an X-axis direction on the touch panel 13, it is difficult to change the touch position in such a manner with a person's hand. In reality, as illustratively shown in FIG. 10, a track Ksa obtained from such a touch operation does not precisely coincide with a direction XP1 that extends along the X-axis on the touch panel 13. The same is true for a Y-axis direction on the touch panel 13. Thus, only the above-described manner of controlling the position of the virtual camera Ca cannot always realize a pleasant operation for the user when the user wishes to move the virtual camera Ca to a position that has been rotated precisely along the horizontal plane or the vertical plane in the virtual space.

Therefore, in the present embodiment, the lateral direction input area Xa and the longitudinal direction input area Ya are provided, as described above, on the touch panel 13 so as to allow the user to control the position of the virtual camera Ca precisely along the horizontal plane or the vertical plane in the virtual space. Described below in the present embodiment are a case where the user has moved the stylus pen 27 in the lateral direction input area Xa and a case where the user has moved the stylus pen 27 in the longitudinal direction input area Ya.

Figure 11:
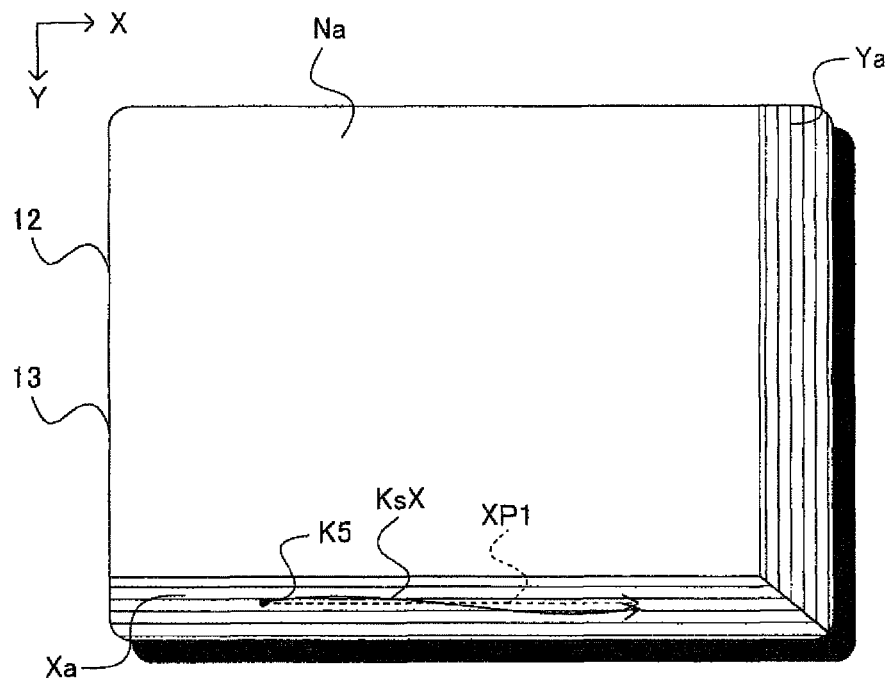
FIG. 11 shows an example of a track of touch positions in a lateral direction input area Xa.

First, a case where the user has changed a touch position located in the lateral direction input area Xa will be described. FIG. 11 shows an example of a track KsX that is obtained when the user has changed a touch position from an arbitrary position K5 located in the lateral direction input area Xa on the touch panel 13 toward an X-axis positive direction XP1 on the touch panel 13. In the present embodiment, when the user has changed a touch position located in the lateral direction input area Xa (i.e., when the user has performed a slide operation of which the starting point is an arbitrary point in the lateral direction input area Xa) the amount of change in the touch position in the Y-axis directions on the touch panel 13 is ignored. Accordingly, when the user has changed a touch position located in the lateral direction input area Xa on the touch panel 13, it is assumed that a track XP1 extending precisely along an X-axis direction on the touch panel 13 has been inputted as illustratively shown in FIG. 11, even if the track KsX, which is an actual track, deviates in the Y-axis directions. As a result, when the user has changed the touch position located in the lateral direction input area Xa on the touch panel 13, the virtual camera Ca is moved precisely along the horizontal plane in the virtual space, as described above with reference to FIGS. 7A and 7B.

Figure 12:
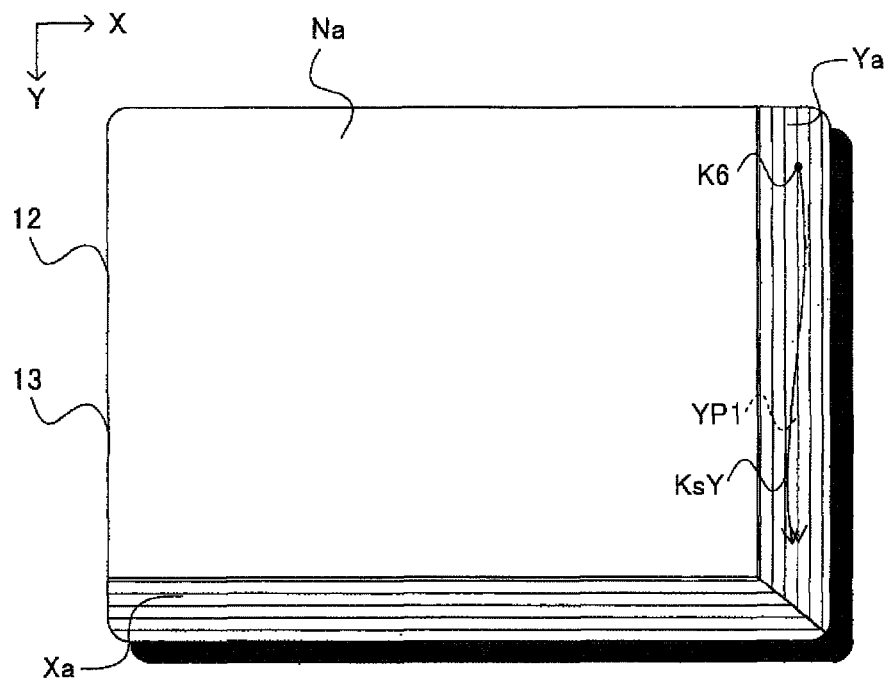
FIG. 12 shows an example of a track of touch positions in a longitudinal direction input area Ya.

Next, a case where the user has changed a touch position located in the longitudinal direction input area Ya will be described. FIG. 12 shows an example of a track KsY that is obtained when the user has changed a touch position (roman arbitrary position K6 located in the longitudinal direction input area Ya on the touch panel 13 toward a Y-axis positive direction YP1 on the touch panel 13. In the present embodiment, when the user has changed a touch position located in the longitudinal direction input area Ya (i.e., when the user has performed a slide operation of which the starting point is an arbitrary point in the longitudinal direction input area Ya), the amount of change in the touch position in the X-axis directions on the touch panel 13 is ignored. Accordingly, when the user has changed a touch position located in the longitudinal direction input area Ya on the touch panel 13, it is assumed that a track YP1 extending precisely along a Y-axis direction on the touch panel 13 has been inputted as illustratively shown in FIG. 12, even if the track KsY, which is an actual track, deviates in the X-axis directions. As a result, when the user has changed the touch position located in the longitudinal direction input area Ya on the touch panel 13, the virtual camera Ca is moved precisely along the vertical plane in the virtual space, as described above with reference to FIGS. 8A and 8B.

The camera position control process of the present embodiment is as described above. In the present embodiment, the lateral direction input area Xa and the longitudinal direction input area Ya are provided in addition to the free direction input area Na. This realizes a pleasant operation for the user when the user wishes to move the virtual camera Ca precisely along the horizontal plane or the vertical plane in the virtual space.

Described next is a flow of processing performed by the CPU 31 of the game apparatus 1 of the present embodiment.

In the present embodiment, every 1/60 second, the CPU 31 detects a state of each of the operation buttons 14A to 14H and obtains touch position data. When detecting the state of each of the operation buttons 14A to 14H, the CPU 31 controls actions of the player character Pc in accordance with the detected state of each of the operation buttons 14 to 14H, and calculates, for example, positions and orientations of objects (e.g., the player character Pc) in the virtual space, which are to be displayed on the upper LCD 22. After calculating the positions, orientations, and the like of the objects in the virtual space, the CPU 31 calculates, as described above, the position and orientation of the virtual camera Ca based on the obtained touch position data. Then, as a game image to be shown in a game screen displayed on the upper LCD 22, the CPU 31 generates an image of the virtual space, which has been taken by the virtual camera Ca whose position and orientation have been calculated, in which virtual space the objects such as the player character Pc and the like, whose positions, orientations, and the like have been calculated, are present.

In addition to calculating the game image to be displayed on the upper LCD 22, the CPU 31 calculates, based on the position of the player character Pc in the virtual space, a display position of the symbol Pcp that is to be displayed on the lower LCD 12 together with a map. Then, as a game image to be shown in a game screen displayed on the lower LCD 12, the CPU 31 generates an image in which the symbol Pcp, of which the display position has been calculated, is superimposed onto the map.

When calculating the game images to be displayed on the upper LCD 22 and the lower LCD 12, the CPU 31 displays the calculated game images on the upper LCD 22 and the lower LCD 12.

Figure 13:
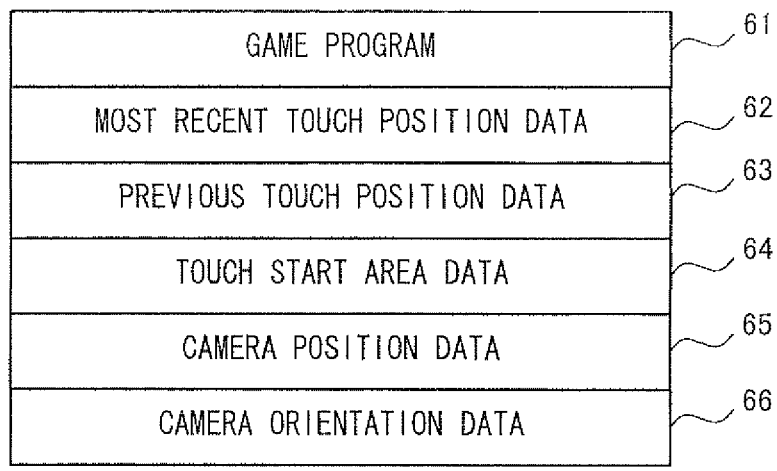
FIG. 13 is a memory map of a main memory at the time of execution of a game program.

FIG. 13 shows an example of various data to be contained in the main memory 32 at the time of execution of the game program. The main memory 32 stores a game program 61 read from the memory card 29, most recent touch position data 62, previous touch position data 63, a touch start area data 64, camera position data 65, camera orientation data 66, and the like.

The most recent touch position data 62 is touch position data (two-dimensional coordinates data) that has most recently been obtained by the CPU 31 via the I/F circuit 42.

The previous touch position data 63 is touch position data that has been obtained immediately previously to the touch position data that indicates the most recent touch position.

The touch start area data 64 indicates an area among the free direction input area Na, the lateral direction input area Xa, and the longitudinal direction input area Ya, to which area a point at which a touch position has started changing (i.e., a point which has first been touched in a slide operation) belongs to.

The camera position data 65 is three-dimensional coordinates data that indicates a position of the virtual camera Ca in the virtual space.

The camera orientation data 66 indicates an orientation of the virtual camera Ca in the virtual space, by using an angle around the X-axis (a roll angle), an angle around the Y-axis (a yaw angle), and an angle around the Z-axis (a pitch angle).

Hereinafter, a flow of processing that is performed by the CPU 31 based on the game program 61 will be described with reference to flowcharts of FIGS. 14 and 15.

Figure 14:
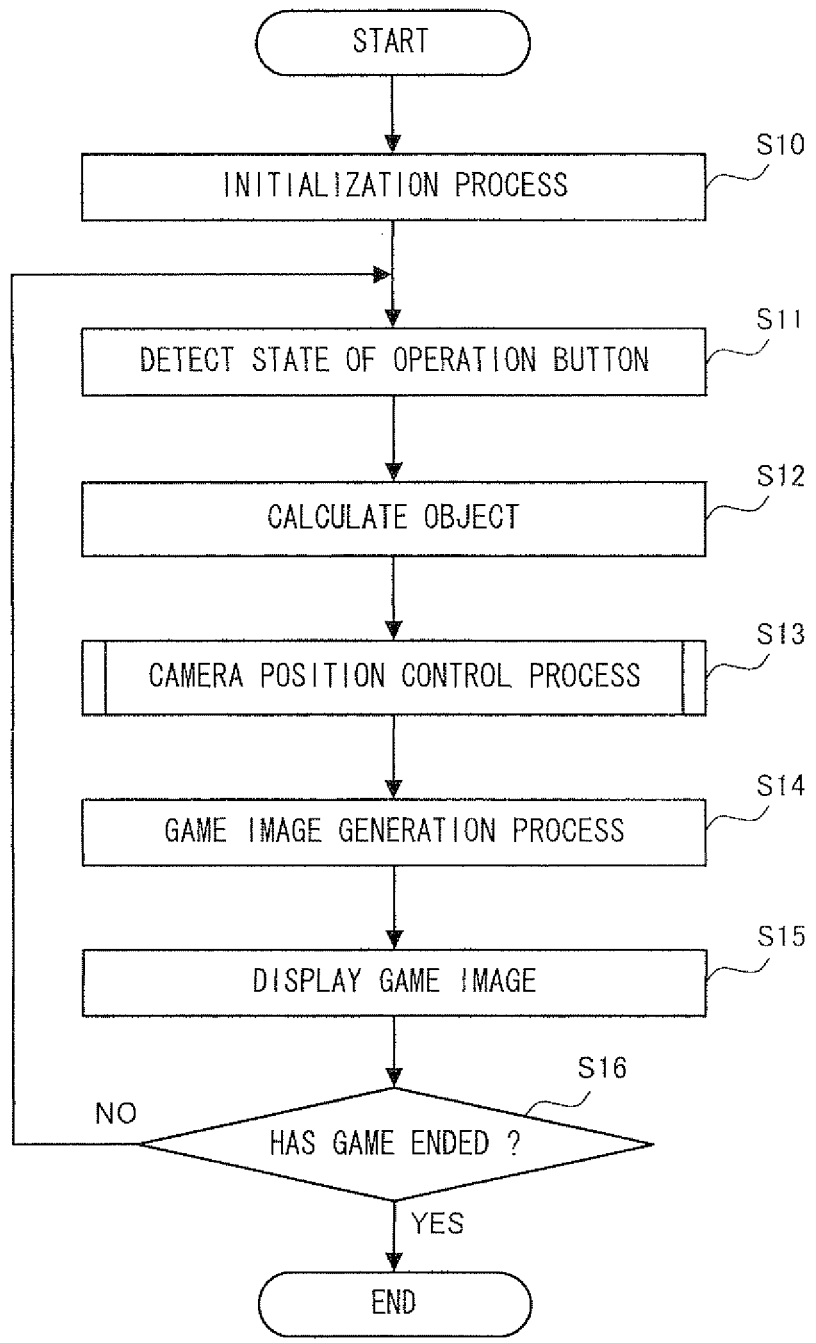
FIG. 14 is a flowchart showing a flow of processing that is performed by a CPU 31 when the game program is executed.
Figure 15:
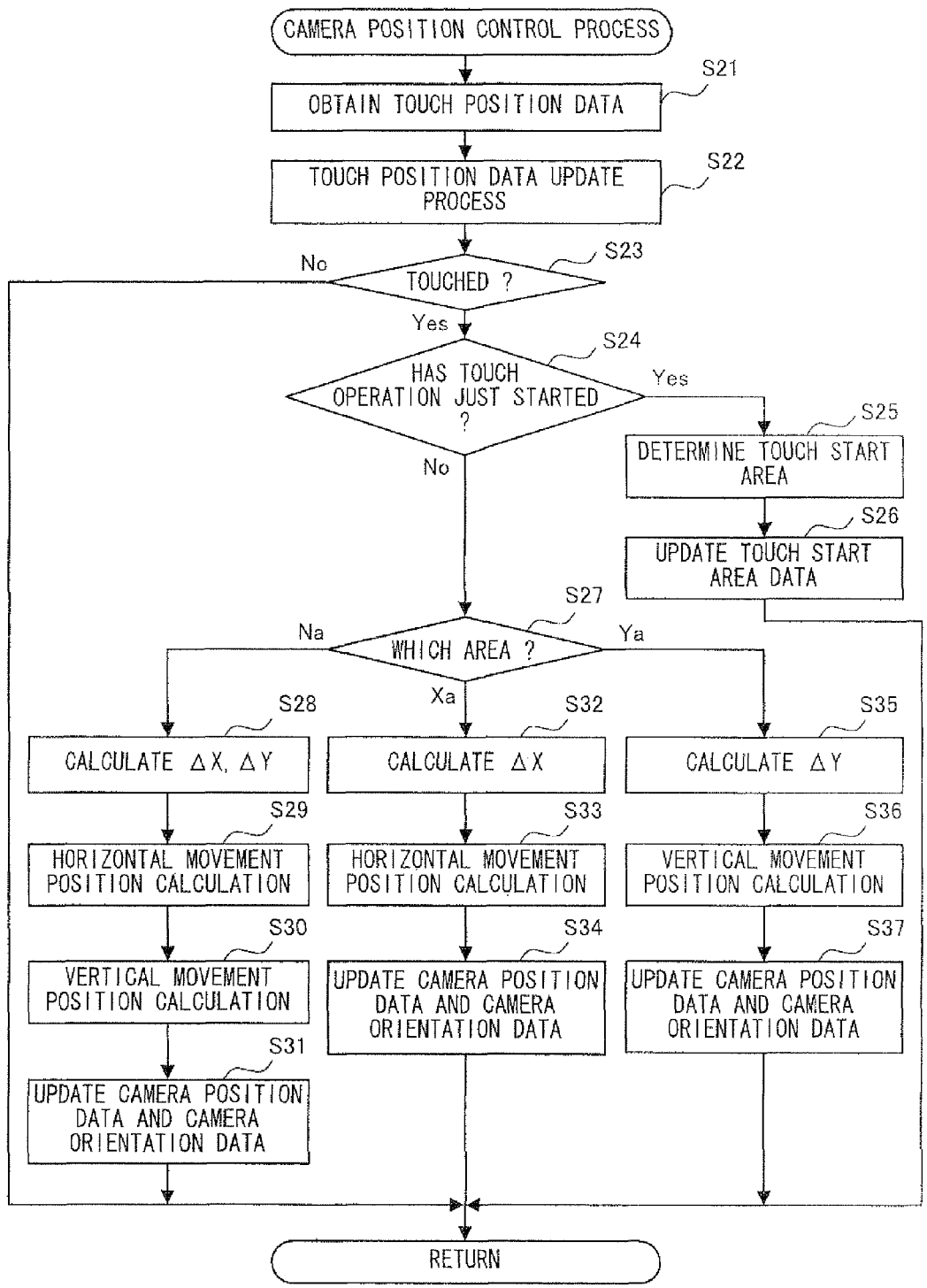
FIG. 15 is a flowchart showing a flow of a camera position control process.

When the game program 61 starts being executed, the CPU 31 performs an initialization process at step S10 of FIG. 14. The initialization process includes processes such as: a process of inputting an initial value of each parameter used in the game processing; and a process of arranging objects, including the player character Pc and the like, and the virtual camera Ca so as to be located at initial positions in the virtual space.

At step S11, the CPU 31 detects a state of each of the operation buttons 14A to 14H.

At step S12, based on the state of each of the operation buttons 14A to 14H, which has been detected at step S11, the CPU 31 controls, for example, an action of the player character Pc, and calculates positions and orientations of the objects in the virtual space, including the position and orientation of the player character Pc.

At step S13, the CPU 31 performs the above-described camera position control process, based on a touch position on the touch panel 13. A flow of the camera position control process of the present embodiment will be described later in detail.

At step S14, the CPU 31 generates a game image to be displayed on the upper LCD 22, based on the positions and orientations of the objects in the virtual space, which have been calculated at step S12, and based on the position and orientation of the virtual camera Ca in the virtual space, which have been calculated in the camera position control process at step S13. Further, based on the position of the player character Pc in the virtual space, which has been calculated at step S12, the CPU 31 calculates a display position of the symbol Pcp of the player character Pc, which symbol Pcp is to be displayed on the lower LCD 12 together with a map. Then, the CPU 31 generates a game image in which the symbol Pcp, of which the display position has been calculated, is superimposed onto the map.

At step S15, the CPU 31 causes the upper LCD 22 and the lower LCD 12 to display the game images generated at step S14.

At step S16, the CPU 31 determines whether or not the game has ended. When the game has ended, the CPU 31 ends the execution of the game program 61. Whereas, when the game is still continuing, the processing returns to step S11.

Accordingly, the map that indicates a current position of the player character Pc in the virtual space is displayed on the lower LCD 12, and the player character Pc placed in the virtual space is displayed on the upper LCD 22.

Since, as described above, the processing from step S11 to step S16 is repeatedly performed every 1/60 second, the screens displayed on the lower LCD 12 and the upper LCD 22 are updated at the cycle of 1/60 second in the present embodiment.

Next, with reference to FIG. 15, the camera position control process performed at step S13 of FIG. 14 will be described in detail.

At step S21, the CPU 31 obtains touch position data via the I/F circuit 42.

At step S22, the CPU 31 performs a touch position data update process in which to update the most recent touch position data 62 and the previous touch position data 63. Note that, when the touch position data most recently obtained at step S21 is a Null value (i.e., when a touch operation has not been performed on the input surface of the touch panel 13), the Null value is stored as the most recent touch position data 62.

At step S23, the CPU 31 determines whether or not a touch operation has been performed on the input surface of the touch panel 13. To be specific, the CPU 31 determines whether or not the most recent touch position data 62 is a Null value. At step S23, if the CPU 31 has determined that the most recent touch position data 62 is a Null value, then the CPU 31 determines that a touch operation has not been performed, and proceeds to step S14 of the processing. On the other hand, if the CPU 31 has determined at step S23 that the most recent touch position data 62 is not a Null value, then the CPU 31 determines that a touch operation has been performed, and proceeds to step S24 of the processing.

At step S24, the CPU 31 determines whether or not the touch position indicated by the most recent touch position data 62 is a touch position that indicates a starting point of a slide operation. To be specific, when the most recent touch position data 62 is not a Null value and the previous touch position data 63 is a Null value, the CPU 31 can determine that the touch position indicated by the most recent touch position data 62 is a touch position that indicates a starting point of a slide operation. On the other hand, when neither the most recent touch position data 62 nor the previous touch position data 63 is a Null value, the CPU 31 can determine that a slide operation is being performed. When determining at step S24 that the touch position indicated by the most recent touch position data 62 is a starting point of a slide operation, the CPU 31 proceeds to step S25 of the processing. On the other hand, when determining at step S24 that the touch position indicated by the most recent touch position data 62 is not a starting point of a slide operation, the CPU 31 proceeds to step S27 of the processing.

At step S25, the CPU 31 determines an area among the free direction input area Na, the lateral direction input area Xa, and the longitudinal direction input area Ya, to which area the touch position indicated by the most recent touch position data 62 belongs to. Note that, this determination is performed with reference to area information that indicates positions of the respective input areas and the boundaries among the respective input areas. The area information may be contained in the game program 61, for example.

At step S26, the CPU 31 updates the touch start area data 64 in accordance with a result of the determination at step S25, and then ends the camera position control process of step S13.

Meanwhile, at step S27, the CPU 31 refers to the touch start area data 64 and then proceeds to a processing step corresponding to the touch start area. To be specific, the CPU 31 proceeds to step S28 of the processing when the touch start area is the free direction input area Na. Alternatively, the CPU 31 proceeds to step S32 of the processing when the touch start area is the lateral direction input area Xa. Further alternatively, the CPU 31 proceeds to step S35 of the processing when the touch start area is the longitudinal direction input area Ya.

At step S28, the CPU 31 calculates the amount of change in the touch position in relation to the X- and Y-axis directions on the touch panel 13. To be specific, when it is assumed that the X-coordinate value of the most recent touch position data 62 is defined as Xc and the X-coordinate value of the previous touch position data 63 is defined as Xp, the CPU 31 calculates Xc−Xp as a change amount ΔX. Also, when it is assumed that the Y-coordinate value of the most recent touch position data 62 is defined as Yc and the Y-coordinate value of the previous touch position data 63 is defined as Yp, the CPU 31 calculates Yc−Yp as a change amount ΔY. Note that, when the change amount ΔX calculated in the above manner is a negative numeral, it means that the touch position has been moved in the X-axis negative direction on the touch panel 13. Whereas, when the calculated change amount ΔX is a positive numeral, it means that the touch position has been moved in the X-axis positive direction on the touch panel 13. Further, when the change amount ΔY calculated in the above manner is a negative numeral, it means that the touch position has been moved in the Y-axis negative direction on the touch panel 13. Whereas, when the calculated change amount ΔY is a positive numeral, it means that the touch position has been moved in the Y-axis positive direction on the touch panel 13.

At step S29, the CPU 31 performs the above-described horizontal movement position calculation based on the change amount ΔX calculated at step S28, and then updates the position and orientation of the virtual camera Ca.

At step S30, the CPU 31 performs the above-described vertical movement position calculation based on the change amount ΔY calculated at step S28, and then further updates the position and orientation of the virtual camera Ca. Note that the processing sequence of the steps S29 and S30 may be reverse to the above.

At step S31, the CPU 31 updates the camera position data 65 and the camera orientation data 66, based on a result of the calculation at step S30, and then ends the camera position control process of step S13.

At step S32, the CPU 31 calculates the amount of change in the touch position in relation to the X-axis direction on the touch panel 13. To be specific, the CPU 31 calculates the above-described change amount ΔX.

At step S33, the CPU 31 performs the horizontal movement position calculation based on the change amount ΔX calculated at step S32, and then updates the position and orientation of the virtual camera Ca.

At step S34, the CPU 31 updates the camera position data 65 and the camera orientation data 66, based on a result of the calculation at step S33, and then ends the camera position control process of step S13.

At step S35, the CPU 31 calculates the amount of change in the touch position in relation to the Y-axis direction on the touch panel 13. To be specific, the CPU 31 calculates the above-described change amount ΔY.

At step S36, the CPU 31 performs the vertical movement position calculation based on the change amount ΔY calculated at step S35, and then updates the position and orientation of the virtual camera Ca.

At step S37, the CPU 31 updates the camera position data 65 and the camera orientation data 66, based on a result of the calculation at step S36, and then ends the camera position control process of step S13.

As described above, according to the present embodiment, the user can move the virtual camera Ca in an arbitrary direction by performing a slide operation in the free direction input area Na. Further, if the user wishes to move the virtual camera Ca along the horizontal plane in the virtual space, the user can readily move the virtual camera Ca precisely along the horizontal plane by performing a slide operation in the lateral direction input area Xa, instead of performing a slide operation in the free direction input area Na. Still further, if the user wishes to move the virtual camera Ca along the vertical plane in the virtual space, the user can readily move the virtual camera Ca precisely along the vertical plane by performing a slide operation in the longitudinal direction input area Ya, instead of performing a slide operation in the free direction input area Na. Accordingly, even when the user wishes to perform, for example, a rectilinear slide operation along the X-axis or the Y-axis on the touch panel 13, the user is not required to perform a precise operation in which the user needs to carefully look at the touch panel 13. As a result, the user can perform a desired input operation even while looking at the game image displayed on the upper LCD 22.

To be specific, the user uses the free direction input area Na when the user wishes the game processing to be performed based on both the X- and Y-coordinate values of a touch position on the touch panel 13. Alternatively, the user uses the lateral direction input area Xa when the user wishes the game processing to be performed based only on the X-coordinate value of a touch position on the touch panel 13. Further alternatively, the user uses the longitudinal direction input area Ya when the user wishes the game processing to be performed based only on the Y-coordinate value of a touch position on the touch panel 13. In this manner, the user can selectively use these input areas depending on the user's intended purpose.

In other words, the free direction input area Na can be alternatively referred to as an "input area for inputting both X- and Y-coordinate values" or as an "input area in which both X- and Y-coordinate values are used as valid coordinate values", and the lateral direction input area Xa can be alternatively referred to as an "input area for inputting only an X-coordinate value" or as an "input area in which only an X-coordinate value of X- and Y-coordinate values is used as a valid coordinate value and the Y-coordinate value thereof is ignored". Similarly, the longitudinal direction input area Ya can be alternatively referred to as an "input area for inputting only a Y-coordinate value" or as an "input area in which only a Y-coordinate value of X- and Y-coordinate values is used as a valid coordinate value and the X-coordinate value thereof is ignored". Moreover, the free direction input area Na can be alternatively referred to as an "input area in which arbitrary two-dimensional coordinates can be inputted". Furthermore, the lateral direction input area Xa and the longitudinal direction input area Ya can each be alternatively referred to as an "input area in which only a predetermined direction component is used as a valid component when arbitrary two-dimensional coordinates are inputted". The "predetermined direction" herein is not limited to a direction extending along a reference axis (i.e., the X-axis or Y-axis), but may be an arbitrary direction (e.g., a direction that forms an angle of 45 degrees with the Z-axis).

In the present embodiment, the process to be performed after step S27 (i.e., step S28, step S32, or step S35) is determined based not on the most recent touch position data but on the touch start area. Therefore, for example, even if a touch position enters the free direction input area Na against the user's intention when the user is performing a slide operation of which the starting point is within the lateral direction input area Xa, the vertical movement position calculation (step S30) for the virtual camera Ca will not be performed against the user's intention.

(Variations)

Hereinafter, variations of the above-described embodiment will be described.

Figure 16:
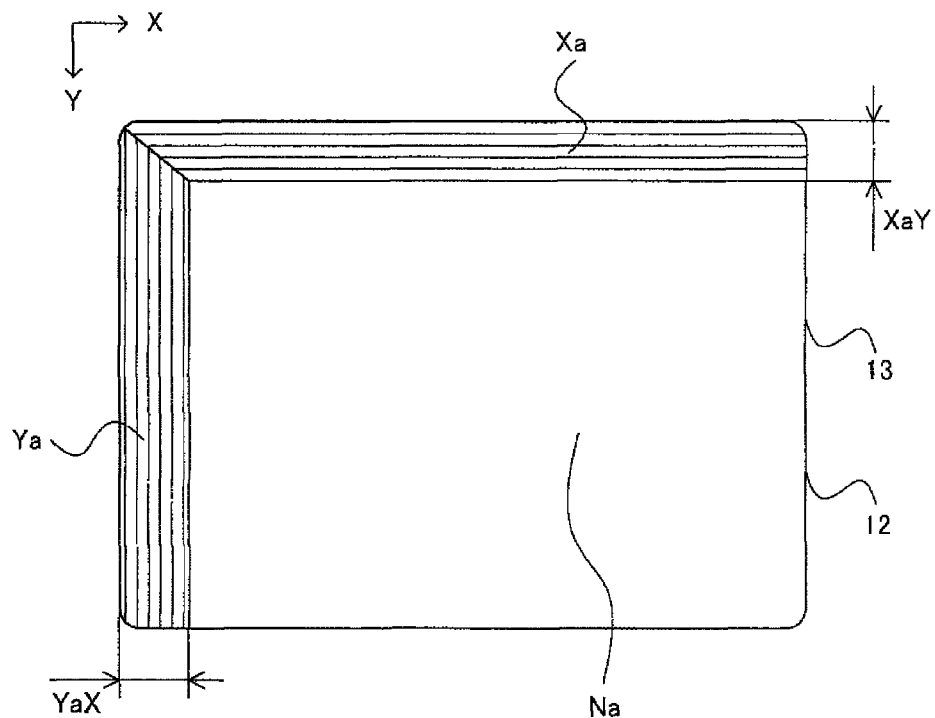
FIG. 16 shows another example of the input areas on the touch panel.
Figure 17:
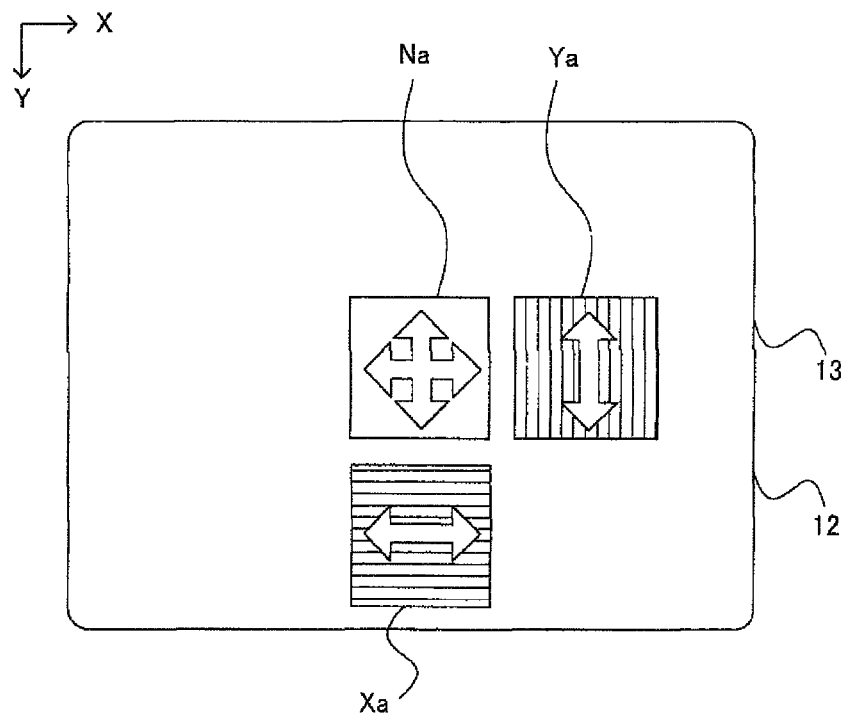
FIG. 17 shows another further example of the input areas on the touch panel.

The above embodiment defines, as the lateral direction input area Xa, the predetermined area having the width XaY, which extends from the end of the Y-axis positive direction side of the touch panel 13 toward the Y-axis negative direction. The present embodiment also defines, as the longitudinal direction input area Ya, the predetermined area having the width YaX, which extends from the end of the X-axis positive direction side of the touch panel 13 toward the X-axis negative direction. The present embodiment further defines an area different from the above areas as the free direction input area Na. However, the shapes and positions of these input areas are not limited to the above. The input areas may take a form in which either the lateral direction input area Xa or the longitudinal direction input area Ya does not exist. FIG. 16 shows an example in which: a predetermined area having the width XaY, which extends from the end of the Y-axis negative direction side of the touch panel 13 toward the Y-axis positive direction, is defined as the lateral direction input area Xa; and a predetermined area having the width YaX, which extends from the end of the X-axis negative direction side of the touch panel 13 toward the X-axis positive direction, is defined as the longitudinal direction input area Ya. In another example, the lateral direction input area Xa may be provided at both the end of the Y-axis positive direction side and the end of the Y-axis negative direction side of the touch panel 13. Similarly, the longitudinal direction input area Ya may be provided at both the end of the X-axis positive direction side and the end of the X-axis negative direction side of the touch panel 13. FIG. 17 shows another further example of the free direction input area Na, the lateral direction input area Xa, and the longitudinal direction input area Ya.

Figure 18:
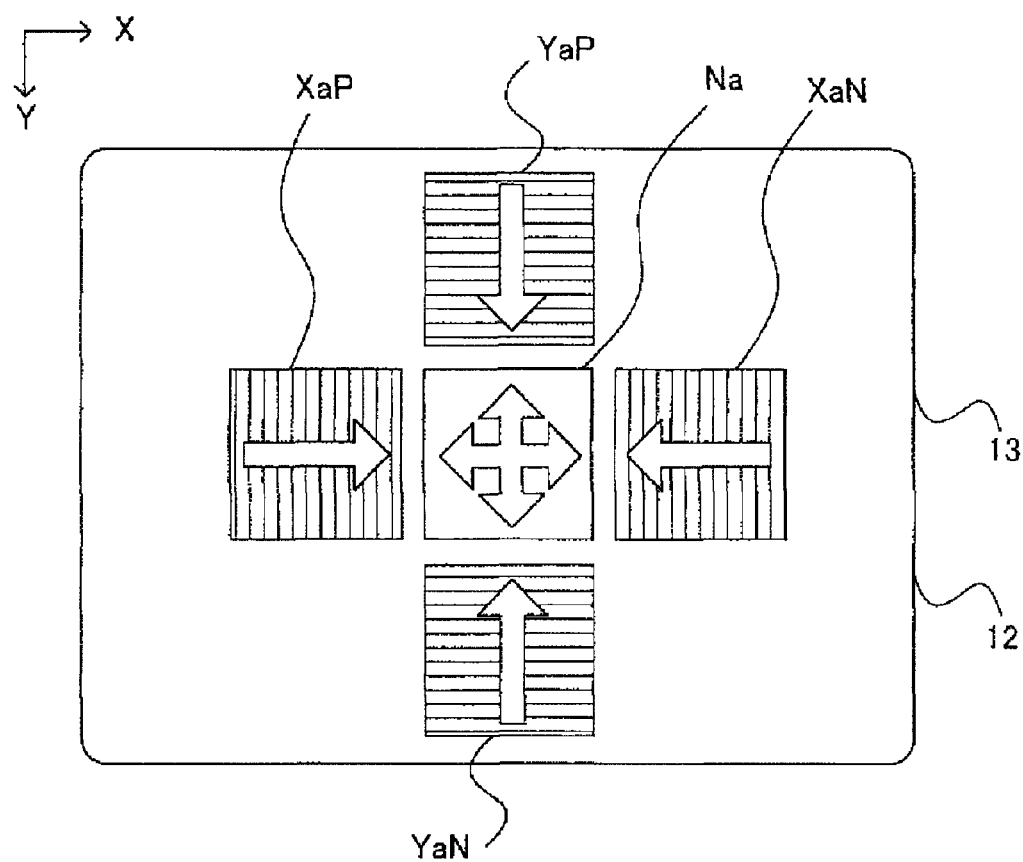
FIG. 18 shows another further example of the input areas on the touch panel.

Note that, in the above-described embodiment, the horizontal movement position calculation for the virtual camera Ca is performed based on the amount of change in the X-coordinate value both in the case of moving a touch position to the right on the screen by having an arbitrary point located in the lateral direction input area Xa as a starting point of the touch position movement, and in the case of moving a touch position to the left on the screen by having an arbitrary point located in the lateral direction input area Xa as a starting point of the touch position movement. However, in another embodiment, as shown in FIG. 18, a rightward direction input area XaP and a leftward direction input area XaN may be provided. As for the rightward direction input area XaP, the horizontal movement position calculation for the virtual camera Ca is performed only when a touch position in the rightward direction input area XaP has been moved in the X-axis positive direction. As for the leftward direction input area XaN, the horizontal movement position calculation for the virtual camera Ca is performed only when a touch position in the leftward direction input area XaN has been moved in the X-axis negative direction. Similarly, a downward direction input area YaP and an upward direction input area YaN may be provided. As for the downward direction input area YaP, the vertical movement position calculation for the virtual camera Ca is performed only when a touch position in the downward direction input area YaP has been moved in the Y-axis positive direction. As for the upward direction input area YaN, the vertical movement position calculation for the virtual camera Ca is performed only when a touch position in the upward direction input area YaN has been moved in the Y-axis negative direction.

Further, in the above-described embodiment, the predetermined area having the width YaX, which extends from the end of the X-axis positive direction side of the touch panel 13 toward the X-axis negative direction, i.e., the right side area of the touch panel 13, is fixedly defined as the longitudinal direction input area Ya. However, in another embodiment, the user may be allowed to change the position and shape of such an input area as necessary. For example, the longitudinal direction input area Ya may be defined by taking into account the dominant hand of the user. To be more specific, a process of setting the dominant hand of the user and a process of setting the longitudinal direction input area Ya in accordance with the set dominant hand, may be added to the above-described game program. In the case where the longitudinal direction input area Ya is set in accordance with the dominant hand of the user, if the user is, for example, left-handed, then a predetermined area having the width YaX, which extends from the end of the X-axis negative direction side of the touch panel 13 toward the X-axis positive direction, i.e., the left side area of the touch panel 13, may be set as the longitudinal direction input area Ya.

Still further, in the above-described embodiment, the process to be performed after step S27 (i.e., step S28, step S32, or step S35) is determined based on a touch start area. However, in another embodiment, the process to be performed after step S27 (i.e., step S28, step S32, or step S35) may be determined based on the most recent touch position data.

Still further, in the above-described embodiment, the touch start area data 64 indicating a touch start area is stored in the main memory 32. However, the main memory 32 may store touch position data that indicates a touch start position (i.e., a starting point of a slide operation), instead of storing the touch start area data 64 that indicates a touch start area. In this case, at step S27, the CPU 31 may refer to such touch position data stored in the main memory 32 to determine an input area to which the touch start position belongs.

Still further, in the present embodiment, when the user changes a touch position in the X-axis negative direction XN within the free direction input area Na as shown in FIG. 7A, the virtual camera Ca is moved in the clockwise direction XdN as shown in FIG. 7B. However, in another embodiment, the virtual camera Ca may be moved in the counterclockwise direction XdP when the user changes a touch position in the X-axis negative direction XN within the free direction input area Na. Still further, in the present embodiment, the virtual camera Ca rotates around the gazing point GP as shown in FIG. 7B. However, in another embodiment, the virtual camera Ca may be rectilinearly moved (e.g., rectilinear movement in parallel with the Z-axis in the virtual space).

Note that, in the present embodiment, when the user changes a touch position in the Y-axis positive direction YP within the free direction input area Na as shown in FIG. 8A, the virtual camera Ca is moved in the counterclockwise direction YdP as shown in FIG. 8B. However, in another embodiment, when the user changes a touch position in the Y-axis positive direction YP in the free direction input area Na, the virtual camera Ca may be moved in the clockwise direction YdN. Further, in the present embodiment, the virtual camera Ca rotates around the gazing point GP as shown in FIG. 8B. However, in another embodiment, the virtual camera Ca may be rectilinearly moved (e.g., movement in parallel with the Y-axis in the virtual space).

Still further, in the above-described embodiment, the virtual camera Ca is moved in accordance with a touch position on the touch panel 13. However, a control target to be controlled based on a touch position is not limited to the virtual camera Ca. For example, in another embodiment, not the virtual camera Ca but an arbitrary object in the virtual space may be moved in accordance with a touch position on the touch panel 13.

Still further, in the above-described embodiment, predetermined information processing is performed based on the amount of change ($\Delta X$, $\Delta Y$) in a touch position on the touch panel 13 (i.e., processing for moving the virtual camera Ca). However, in another embodiment, the predetermined information processing may be performed using a direction in which a touch position has changed on the touch panel 13 (i.e., $\Delta Y/\Delta X$). For example, when the user has changed a touch position along an arbitrary direction in the free direction input area Na (e.g., XY in FIG. 9), information processing may be performed based on the direction (XY). Also, when the user has changed a touch position along an arbitrary direction (e.g., KsX in FIG. 11) in the lateral direction input area Xa, information processing may be performed based on a direction that is a result of correcting the direction (KsX) so as to extend along the X-axis on the touch panel 13 (i.e., XP1 in FIG. 11). Further, when the user has changed a touch position along an arbitrary direction (KsY in FIG. 12) in the longitudinal direction input area Ya, information processing may be performed based on a direction that is a result of correcting the direction (KsY) so as to extend along the Y-axis on the touch panel 13 (i.e., YP1 in FIG. 12).

Still further, in the above-described embodiment, predetermined information processing is performed based on the amount of change in a touch position on the touch panel 13 (i.e., based on a difference between a current touch position and a touch position detected immediately previously to the current touch position) (i.e., processing for moving the virtual camera Ca). However, in another embodiment, the predetermined information processing may be performed based on a difference between a current touch position and a predetermined position on the touch panel 13 (e.g., an initial touch position, the coordinate origin, a predetermined fixed position, a touch position obtained from previous processing, or the like). Further alternatively, the predetermined information processing may be performed based on a direction in which the current touch position is located, the direction being seen from a predetermined position on the touch panel 13 (e.g., seen from an initial touch position, the coordinate origin, a predetermined fixed position, a touch position obtained from previous processing, or the like).

Still further, the above embodiment describes an example in which the virtual camera Ca is controlled based on the amount of change ($\Delta X$, $\Delta Y$) in a touch position on the touch panel 13. However, in another embodiment, the virtual camera Ca may be controlled based on a difference between a touch position on the touch panel 13 and a predetermined reference position (e.g., the coordinate origin or another arbitrary position). For example, in the case where a current touch position is (Tx, Ty) and the reference position is (Rx, Ry), if the current touch position is located in the free direction input area Na, then processing for moving the virtual camera Ca along the horizontal plane in the virtual space at a speed corresponding to a difference between Tx and Rx, and processing for moving the virtual camera Ca along the vertical plane in the virtual space at a speed corresponding to a difference between Ty and Ry, may both be performed. Alternatively, if the current touch position is located in the lateral direction input area Xa, only the former processing may be performed. Further alternatively, if the current touch position is located in the longitudinal direction input area Ya, only the latter processing may be performed.

Still further, in the above-described embodiment, a game image generated based on the virtual camera Ca is displayed on the upper LCD 22. However, in another embodiment, a game image generated based on the virtual camera Ca may be displayed on the lower LCD 12.

Still further, in the above-described embodiment, the virtual camera Ca is controlled based on touch position data (two-dimensional coordinates data) that indicates a touch position at which the user has performed a touch operation on the touch panel 13. However, the present invention is applicable not only in the case of using the touch panel 13 but in the case of using an arbitrary pointing device that is capable of detecting, as two-dimensional coordinate values, a position designated by the user on the screen or on the input surface (i.e., a designated position). Examples of such a pointing device are a mouse, a touchpad, a track ball, and the like. For example, in the case of using a mouse, a pointer position on the screen when the user is pressing a mouse button is equivalent to the above-described touch position; an operation, performed by the user, of moving the pointer while keeping pressing the mouse button is equivalent to the above-described slide operation; and a pointer position when the user starts pressing the mouse button is equivalent to a starting point of the slide operation.

The present invention is also applicable in the case of using a pointing device that is capable of detecting, as three-dimensional coordinate values, an arbitrary point which the user has designated in a three-dimensional space (a real or virtual space). Various publicly known pointing devices may be employed as a pointing device capable of designating an arbitrary position in such a three-dimensional space, for example, those using a motion sensor such as an accelerometer, those using a motion capture technology using a camera, and those using a magnetic sensor. Described below with reference to FIGS. 19A to 19D is one of the variations of the embodiment, in which a pointing device capable of designating an arbitrary position in such a three-dimensional space is used. Note that it is assumed in this variation that the position of a controller held by a hand of a user is inputted as a three-dimensional designated position. The position of the controller may be inputted as a three-dimensional designated position only while a predetermined button provided on the controller is being pressed.

Figure 19A:
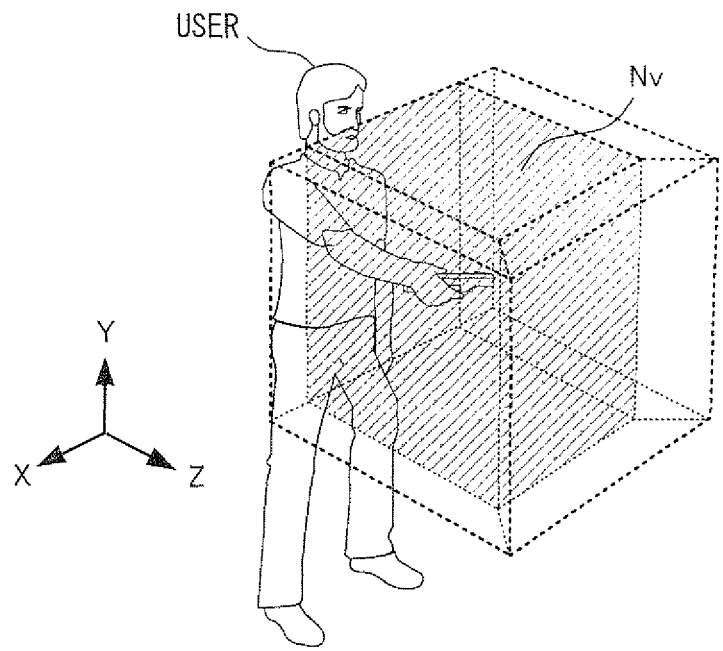
FIG. 19A shows a three-dimensional input area of a variation of an embodiment.

When the user changes a designated position within a three-dimensional area Nv that is a hatched area shown in FIG. 19A (or when a starting point, at which the user starts changing the designated position, is an arbitrary position located in the three-dimensional area Nv), predetermined information processing (e.g., first information processing based on $\Delta X$, second information processing based on $\Delta Y$, and third information processing based on $\Delta Z$) is performed based on the amount of change ($\Delta X$, $\Delta Y$, $\Delta Z$) in the designated position.

Figure 19B:
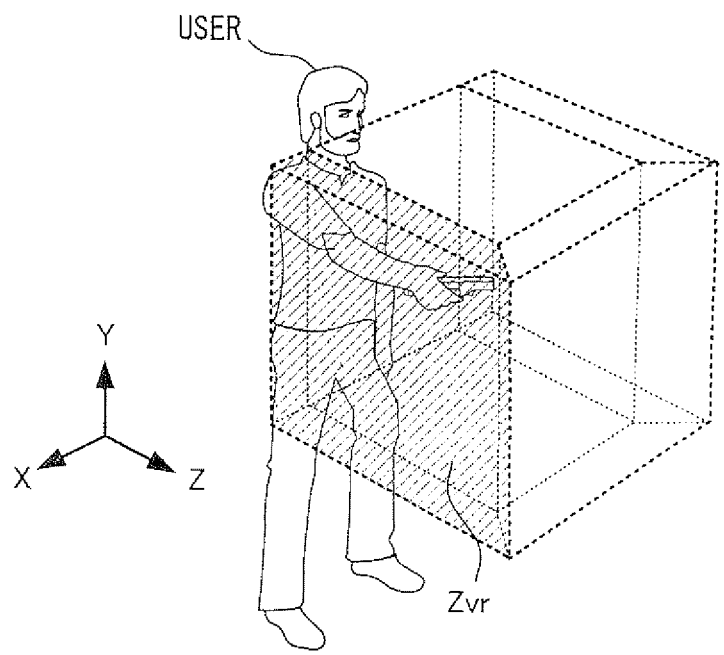
FIG. 19B shows a three-dimensional input area of the variation.

When the user changes a designated position within a three-dimensional area Zvr that is a hatched area shown in FIG. 19B (or when a starting point, at which the user starts changing the designated position, is an arbitrary position located in the three-dimensional area Zvr), predetermined information processing is performed based only on $\Delta Z$ of the amount of change ($\Delta X$, $\Delta Y$, $\Delta Z$) in the designated position (e.g., the third information processing based on $\Delta Z$). Note that, in another variation, When the user changes a designated position within the three-dimensional area Zvr that is the hatched area shown in FIG. 19B (or when a starting point, at which the user starts changing the designated position, is an arbitrary position located in the three-dimensional area Zvr), the predetermined information processing may be performed based only on $\Delta Y$ and $\Delta Z$ of the amount of change ($\Delta X$, $\Delta Y$, $\Delta Z$) in the designated position (e.g., the second information processing based on $\Delta Y$ and the third information processing based on $\Delta Z$).

Figure 19C:
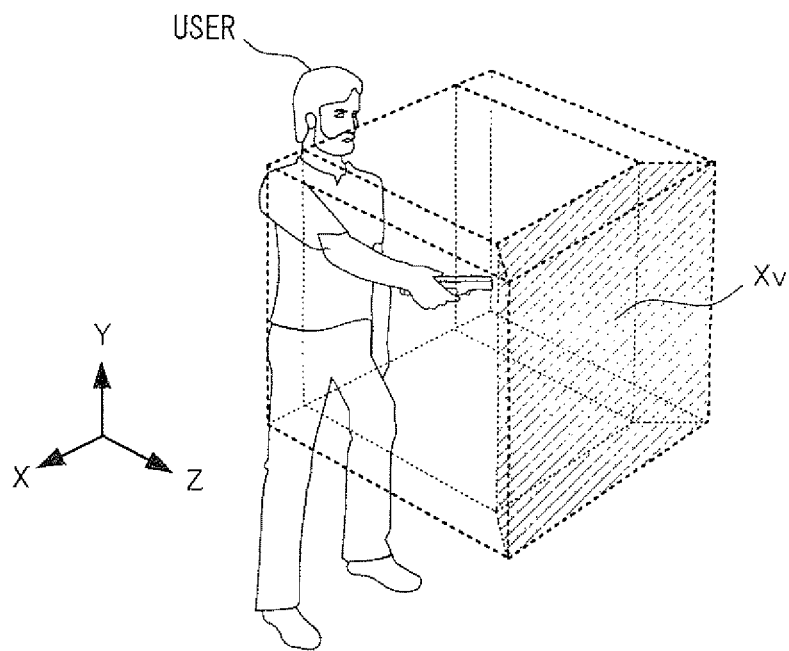
FIG. 19C shows a three-dimensional input area of the variation.

When the user changes a designated position within a three-dimensional area Xv that is a hatched area shown in FIG. 19C (or when a starting point, at which the user starts changing the designated position, is an arbitrary position located in the three-dimensional area Xv), predetermined information processing is performed based only on $\Delta X$ of the amount of change ($\Delta X$, $\Delta Y$, $\Delta Z$) in the designated position (e.g., the first information processing based on $\Delta X$). Note that, in another variation, when the user changes a designated position within the three-dimensional area Xv that is the hatched area shown in FIG. 19C (or when a starting point, at which the user starts changing the designated position, is an arbitrary position located in the three-dimensional area Xv), the predetermined information processing may be performed based only on ΔX and ΔY of the amount of change (ΔX, ΔY, ΔZ) in the designated position (e.g., the first information processing based on ΔX and the second information processing based on ΔY).

Figure 19D:
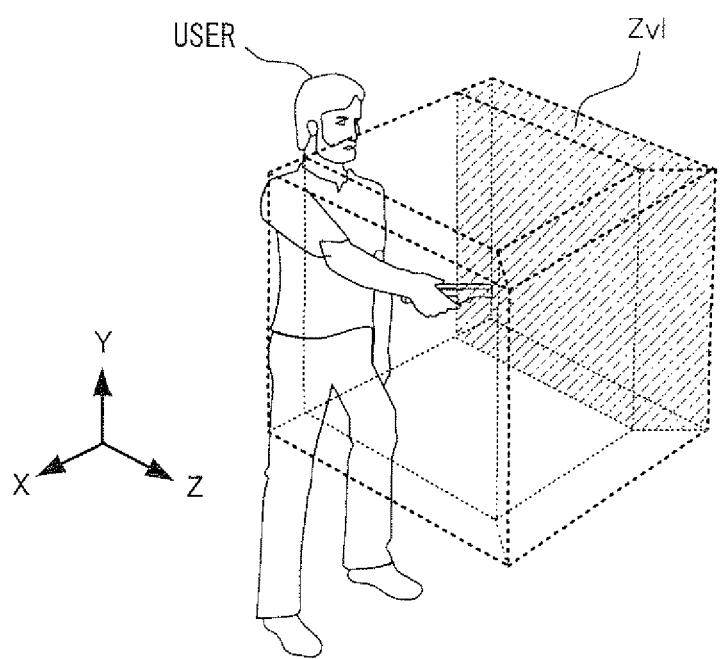
FIG. 19D shows a three-dimensional input area of the variation.

When the user changes a designated position within a three-dimensional area Zv1 that is a hatched area shown in FIG. 19D (or when a starting point, at which the user starts changing the designated position, is an arbitrary position located in the three-dimensional area Zv1), predetermined information processing is performed based only on ΔZ of the amount of change (ΔX, ΔY, ΔZ) in the designated position (e.g., the third information processing based on ΔZ). Note that, in another variation, when the user changes a designated position within the three-dimensional area Zv1 that is the hatched area shown in FIG. 19D (or when a starting point, at which the user starts changing the designated position, is an arbitrary position located in the three-dimensional area Zv1), the predetermined information processing may be performed based only on ΔY and ΔZ of the amount of change (ΔX, ΔY, ΔZ) in the designated position (e.g., the second information processing based on ΔY and the third information processing based on ΔZ).

Although the above description gives an example in which the handheld game apparatus 1 is used, the present invention is not limited thereto. The present invention is also applicable to, for example, a stationary game apparatus, a mobile phone, and any information processing apparatus (information processing system) such as a general personal computer. The present invention is applicable not only to game processing but to any information processing in which predetermined information processing is performed based on an input from a pointing device.

In addition, the shape of the game apparatus 1, the shapes of the operation buttons 14 and the touch panel 13 which are provided on the game apparatus 1, the number of operation buttons 14, the number of touch panels 13, and the positions at which the operation buttons 14 and the touch panel 13 are mounted, which are specified in the above description, are merely examples. It is understood that the present invention can be realized even if other shapes, numbers, and mounting positions are used. Further, the processing sequences, setting values, values used in determination, and the like which are used in the game processing described above are merely examples. It is understood that the present invention can be realized even if different sequences and values are used.

In the above-described embodiment, the single game apparatus 1 realizes the game processing. However, the game processing may not necessarily be realized by a single game apparatus. Multiple information processing apparatuses may work in cooperation with each other to realize the game processing described above. For example, a first information processing apparatus may take a role in receiving coordinates designated by a pointing device; and a second information processing apparatus may take a role in controlling the virtual camera Ca based on the designated coordinates received by the first information processing apparatus.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having an information processing program stored therein, the information processing program, when executed by a computer of an information processing apparatus that is capable of receiving input from a pointing device that is capable of designating an arbitrary position in a multidimensional designation area, causing the computer to perform operations comprising:
   repeatedly receiving designated coordinates that indicate a position, in the designation area, designated by the pointing device;
   determining whether start designated coordinates of the received designated coordinates belong to a first area or a second area in the designation area;
   when the start designated coordinates are determined to belong to the first area, performing predetermined processing by using an uncorrected direction that is based on the received designated coordinates; and
   alternatively, when the start designated coordinates are determined to belong to the second area, performing the predetermined processing by using a direction that is a result of correcting a direction, which is based on the received designated coordinates, so as to correspond to a predetermined direction.

2. The computer-readable storage medium according to claim 1, wherein the uncorrected direction, which is based on the received designated coordinates, is a direction that connects predetermined coordinates and the received designated coordinates.

3. The computer-readable storage medium according to claim 2, wherein the predetermined coordinates are fixed coordinates in the designation area.

4. The computer-readable storage medium according to claim 1, wherein the uncorrected direction, which is based on the received designated coordinates, is a direction that connects the start designated coordinates and received designated coordinates that are designated subsequent to the start designated coordinates.

5. The computer-readable storage medium according to claim 1, wherein when the start designated coordinates are determined to belong to the second area, the predetermined processing is performed by using a predetermined direction component of the received designated coordinates.

6. The computer-readable storage medium according to claim 1, wherein the designation area includes the first area, which is a single area, and a plurality of the second areas.

7. The computer-readable storage medium according to claim 1, wherein the second area is located at an end area of the designation area.

8. The computer-readable storage medium according to claim 1, wherein the predetermined direction is parallel to one of two coordinate axes that define the received designated coordinates.

9. The computer-readable storage medium according to claim 1, wherein the predetermined processing comprises processing for controlling a predetermined control target.

10. The computer-readable storage medium according to claim 9, wherein the predetermined control target comprises a virtual camera in a virtual space.

11. The computer-readable storage medium according to claim 10, wherein the predetermined processing comprises processing for controlling movement of the virtual camera.

12. The computer-readable storage medium according to claim 9, wherein
    the predetermined control target comprises an object in a virtual space, and
    the predetermined processing comprises processing for controlling the object.

13. The computer-readable storage medium according to claim 12, wherein the predetermined processing comprises processing for controlling movement of the object.

14. The computer-readable storage medium according to claim 1, wherein
the received designated coordinates are represented by an X-coordinate value and a Y-coordinate value,
when the start designated coordinates are determined to belong to the first area, the predetermined processing is performed by using both the X-coordinate value and the Y-coordinate value of the received designated coordinates, and
when the start designated coordinates are determined to belong to the second area, the predetermined processing is performed by using only one of the X-coordinate value and the Y-coordinate value of the received designated coordinates.

15. The computer-readable storage medium according to claim 14, wherein
the predetermined processing includes first processing that uses the X-coordinate value of the received designated coordinates and second processing that uses the Y-coordinate value of the received designated coordinates,
when the start designated coordinates are determined to belong to the first area, the first processing is performed by using the X-coordinate value of the received designated coordinates, and the second processing is performed by using the Y-coordinate value of the received designated coordinates, and
when the start designated coordinates are determined to belong to the second area, only one of the first processing and the second processing is performed, by using only one of the X-coordinate value and the Y-coordinate value of the received designated coordinates.

16. The computer-readable storage medium according to claim 1, wherein
when the start designated coordinates are determined to belong to the first area, the predetermined processing is performed by using an uncorrected direction that is based on a series of received designated coordinates that are received after the area determination, and
when the start designated coordinates are determined to belong to the second area, the predetermined processing is performed by using a direction that is a result of correcting a direction, which is based on a series of received designated coordinates that are received after the area determination, so as to correspond to a predetermined direction.

17. An information processing system capable of receiving input from a pointing device that is capable of designating an arbitrary position in a multidimensional designation area, the information processing system comprising:
a designated coordinates receiving unit for repeatedly receiving designated coordinates that indicate a position, in the designation area, designated by the pointing device;
an area determination unit for determining whether start designated coordinates of the received designated coordinates belong to a first area or a second area in the designation area;
a processing unit for, when the area determination unit determines that the start designated coordinates belong to the first area, performing predetermined processing by using an uncorrected direction that is based on the received designated coordinates and for, alternatively, when the area determination unit determines that the start designated coordinates belong to the second area, performing the predetermined processing by using a direction that is a result of correcting a direction, which is based on the received designated coordinates, so as to correspond to a predetermined direction.

18. An information processing method for processing input from a pointing device that is capable of designating an arbitrary position in a multidimensional designation area, the information processing method comprising the following steps performed using a processing system:
repeatedly receiving designated coordinates that indicate a position, in the designation area, designated by the pointing device;
determining whether start designated coordinates of the received designated coordinates belong to a first area or a second area in the designation area;
when the start designated coordinates are determined to belong to the first area, performing predetermined processing by using an uncorrected a direction that is based on the received designated coordinates; and
alternatively, when the start designated coordinates are determined to belong to the second area, performing the predetermined processing by using a direction that is a result of correcting the direction, which is based on the received designated coordinates, so as to correspond to a predetermined direction.

19. An information processing apparatus comprising:
an interface circuit for receiving input from a pointing device configured to designate an arbitrary position in a multidimensional designation area;
memory for storing a program;
a processor for executing the program stored in the memory to control the information processing apparatus to perform operations comprising:
repeatedly receiving designated coordinates that indicate a position, in the designation area, designated by the pointing device;
determining whether or not start designated coordinates of the received designated coordinates belong to a first area or a second area in the designation area;
when the start designated coordinates are determined to belong to the first area, performing predetermined processing by using an uncorrected direction that is based on the received designated coordinates; and
when the start designated coordinates are determined to belong to the second area, performing the predetermined processing by using a direction that is a result of correcting the direction, which is based on the received designated coordinates, so as to correspond to a predetermined direction.

20. The information processing apparatus according to claim 19, further comprising:
a housing configured to be hand-held.

21. An information processing apparatus comprising:
an interface for receiving coordinate data associated with positions designated by a pointing device;
memory for storing a program; and
one or more processors for, when the program is stored in the memory, selectively executing the program to perform an operation by at least:
determining, based on coordinate data, whether an initial designated position is in a first area or a second area;
if the initial designated position is determined to be in the first area, performing the operation based on an uncorrected direction corresponding to coordinate data associated with a series of positions in at least the first area designated by the pointing device; and
if the initial designated position is determined to be in the second area, correcting a direction corresponding to coordinate data associated with a series of positions in at least the second area designated by the pointing device and performing the operation based on the corrected direction.

22. The information processing apparatus according to claim 21, wherein the information processing apparatus is embodied as a mobile phone.

23. The information processing apparatus according to claim 21, wherein the pointing device comprises a touch screen.

24. The information processing apparatus according to claim 21, wherein the pointing device comprises a motion sensor.

25. The information processing apparatus according to claim 21, wherein the pointing device designates positions in a two-dimensional area and is configured to provide two-dimensional coordinate data.

26. The information processing apparatus according to claim 21, wherein the pointing device designates positions in a three-dimensional space and is configured to provide three-dimensional coordinate data.

27. The information processing apparatus according to claim 21, wherein the operation comprises controlling an object in a virtual space.

28. The information processing apparatus according to claim 21, wherein the operation comprises controlling a virtual camera in a virtual space.

29. The information processing apparatus according to claim 21, wherein the corrected direction is one of a group consisting of no more than three different predetermined directions.

30. The information processing apparatus according to claim 21, further comprising:

a wireless communication circuit.

31. The information processing apparatus according to claim 21, wherein the coordinate data comprises coordinate values for two or more coordinate axes and the direction correcting comprises ignoring changes in coordinate values associated with the series of positions for at least one of the coordinate axes.

* * * * *